US010291757B1

(12) United States Patent
Balourdet

(10) Patent No.: US 10,291,757 B1
(45) Date of Patent: *May 14, 2019

(54) EXPLOSION PROOF ASSEMBLY

(71) Applicant: Xciel, Inc., Katy, TX (US)

(72) Inventor: Xavier Balourdet, Houston, TX (US)

(73) Assignee: Xciel, Inc., Katy, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/048,254

(22) Filed: Jul. 28, 2018

Related U.S. Application Data

(63) Continuation of application No. 15/798,080, filed on Oct. 30, 2017, now Pat. No. 10,097,677.

(51) Int. Cl.
| G06F 1/16 | (2006.01) |
| H04M 1/18 | (2006.01) |
| H02J 7/02 | (2016.01) |
| H04B 1/3888 | (2015.01) |
| G02B 7/02 | (2006.01) |
| G06F 3/041 | (2006.01) |

(52) U.S. Cl.
CPC ............ *H04M 1/18* (2013.01); *G06F 1/1656* (2013.01); *H02J 7/025* (2013.01); *H04B 1/3888* (2013.01); *G02B 7/02* (2013.01); *G06F 3/041* (2013.01)

(58) Field of Classification Search
None
See application file for complete search history.

(56) References Cited

U.S. PATENT DOCUMENTS

| 4,664,281 A | 5/1987 | Falk et al. |
| 4,847,602 A | 7/1989 | Altland et al. |
| 4,894,748 A | 1/1990 | Shefet |
| 5,534,664 A | 7/1996 | Fearing, Jr. et al. |
| 5,583,742 A | 12/1996 | Noda et al. |
| 5,838,589 A | 11/1998 | Nail et al. |
| 6,392,322 B1 | 5/2002 | Mares et al. |
| 6,574,652 B2 | 6/2003 | Burkhard |
| 6,583,982 B2 | 6/2003 | Mancini et al. |
| 6,795,319 B2 | 9/2004 | Preston et al. |
| 7,102,081 B2 | 9/2006 | Xu et al. |
| 7,321,096 B1 | 1/2008 | Huang |
| 7,436,653 B2 | 10/2008 | Yang et al. |
| 7,907,394 B2 | 3/2011 | Richardson et al. |
| 7,916,117 B2 | 3/2011 | Staiger |
| 7,921,997 B2 | 4/2011 | Burns |
| 8,328,008 B2 | 12/2012 | Diebel et al. |
| 8,503,170 B1 | 8/2013 | Hsu et al. |
| 8,875,879 B2 | 11/2014 | Diebel et al. |
| 9,261,912 B2 | 2/2016 | Bell |

(Continued)

*Primary Examiner* — David Bilodeau
(74) *Attorney, Agent, or Firm* — Rao DeBoer Osterrieder, PLLC; John M. DeBoer

(57) ABSTRACT

An explosion proof assembly that includes a first portion with a window; an outer touchscreen adhesively sealed around a perimeter of the first portion rear face; and a second portion releasably coupled to the first portion. The second portion has a second portion inner surface defined by a second portion inner edge that transitions into a first dissipation wall. The first portion has a second dissipation wall. The assembly includes a mobile device operable via a mobile device touchscreen. Upon assembly, the outer touchscreen is transmissive to the mobile device touchscreen.

18 Claims, 18 Drawing Sheets

(56) References Cited

U.S. PATENT DOCUMENTS

| | | |
|---|---|---|
| 9,615,476 B2 | 4/2017 | Rayner et al. |
| 2003/0184958 A1 | 10/2003 | Kao |
| 2004/0002269 A1 | 1/2004 | Jahn |
| 2005/0011920 A1 | 1/2005 | Feng |
| 2006/0149430 A1 | 7/2006 | Slaton |
| 2007/0095554 A1 | 5/2007 | Noda |
| 2007/0221288 A1 | 9/2007 | Olesen et al. |
| 2007/0280677 A1 | 12/2007 | Drake et al. |
| 2007/0282208 A1 | 12/2007 | Jacobs et al. |
| 2009/0059492 A1 | 3/2009 | Glover |
| 2009/0272662 A1 | 11/2009 | Lin et al. |
| 2010/0258331 A1 | 10/2010 | Dahlgren et al. |
| 2011/0051348 A1 | 3/2011 | Song |
| 2011/0090846 A1 | 4/2011 | Hao et al. |
| 2012/0033396 A1 | 2/2012 | Goedknegt et al. |
| 2012/0057295 A1 | 3/2012 | Simpson et al. |
| 2012/0314354 A1 | 12/2012 | Rayner |
| 2013/0120258 A1 | 5/2013 | Maus |
| 2013/0193149 A1 | 8/2013 | Balourdet |
| 2013/0271902 A1 | 10/2013 | Lai et al. |
| 2014/0226062 A1 | 8/2014 | Parrill |
| 2015/0194995 A1 | 7/2015 | Fathollahi et al. |
| 2015/0227178 A1 | 8/2015 | Rayner |
| 2015/0265018 A1 | 9/2015 | Balourdet |
| 2017/0187180 A1* | 6/2017 | Freer .................... G01R 31/333 |
| 2018/0046229 A1 | 2/2018 | Balourdet |

\* cited by examiner

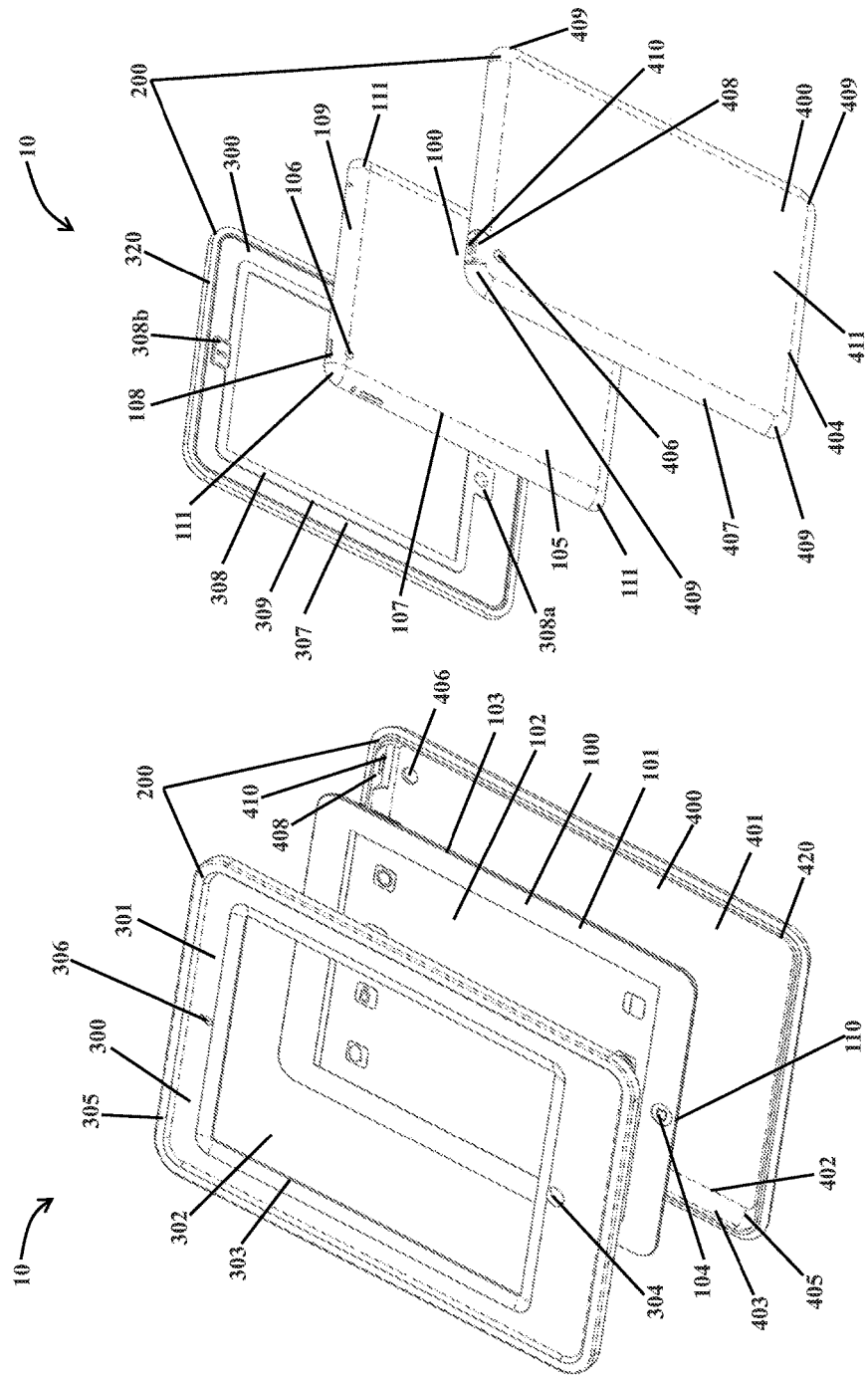

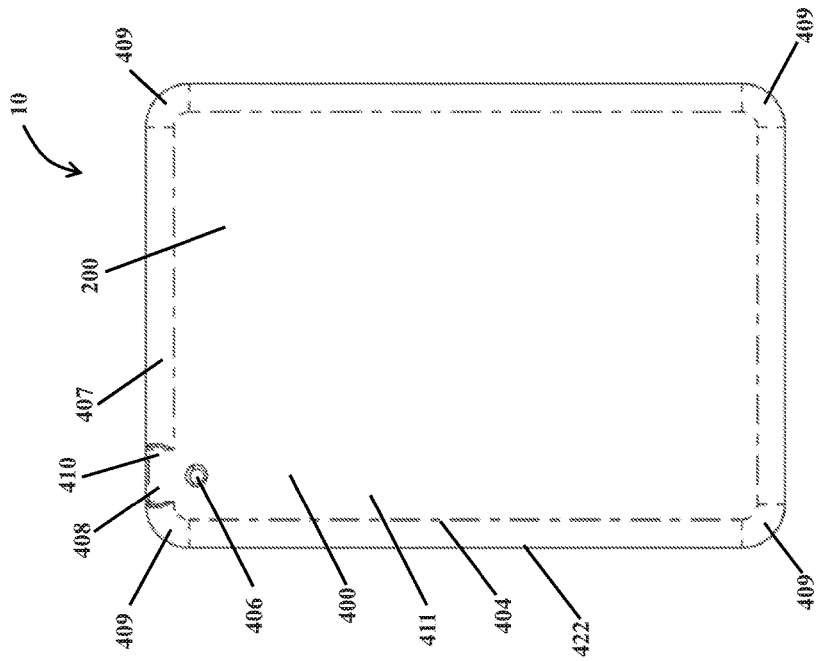
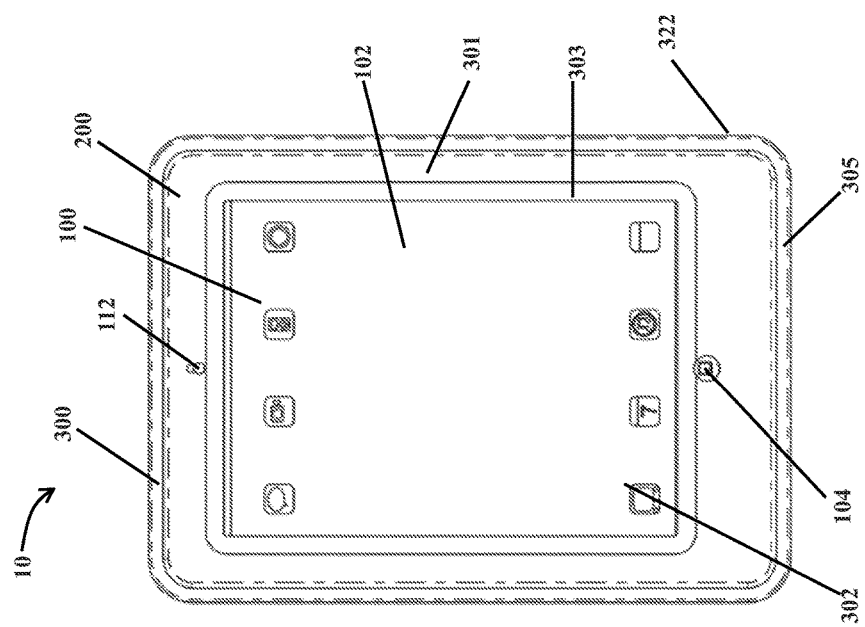
Figure 2B
Figure 2A

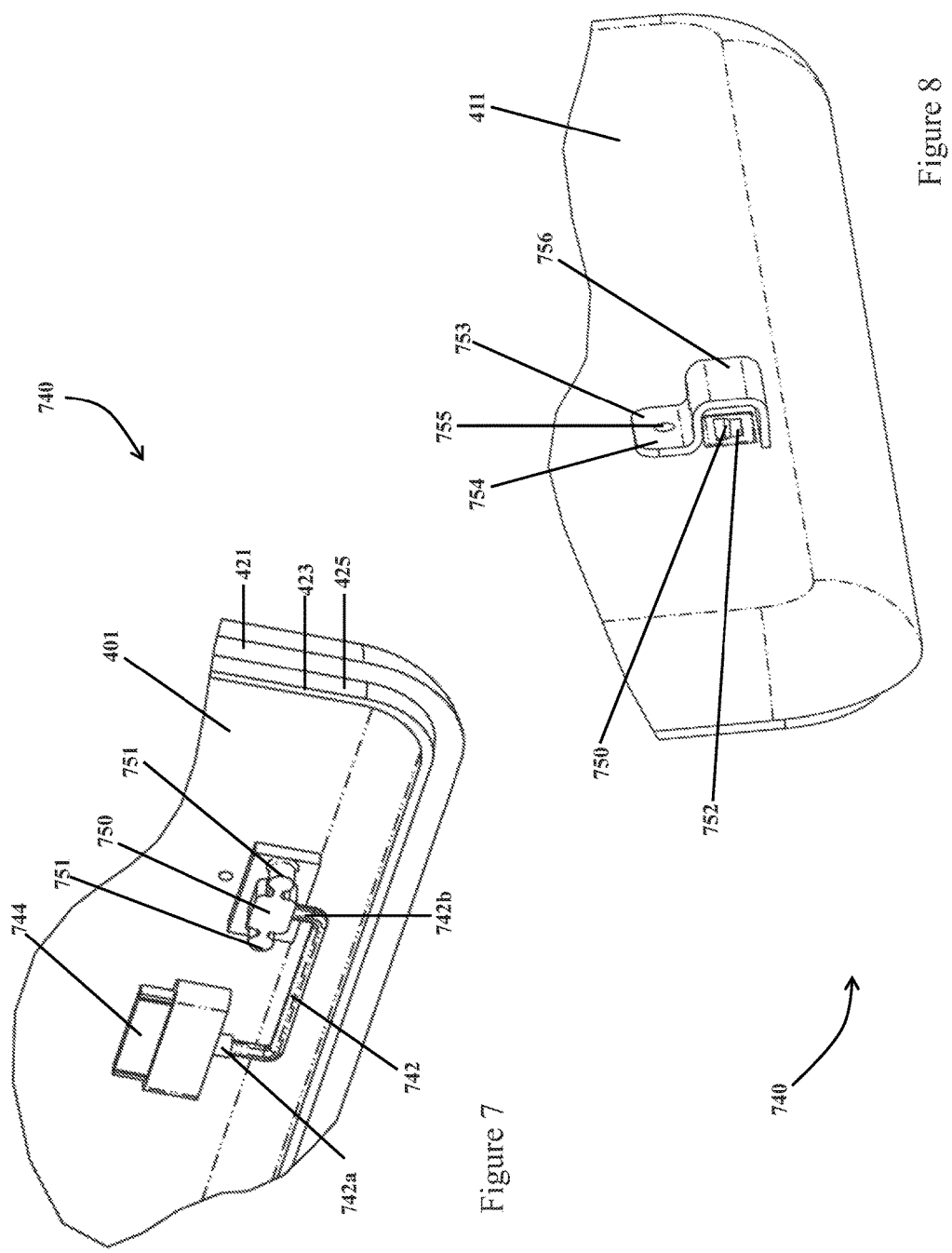

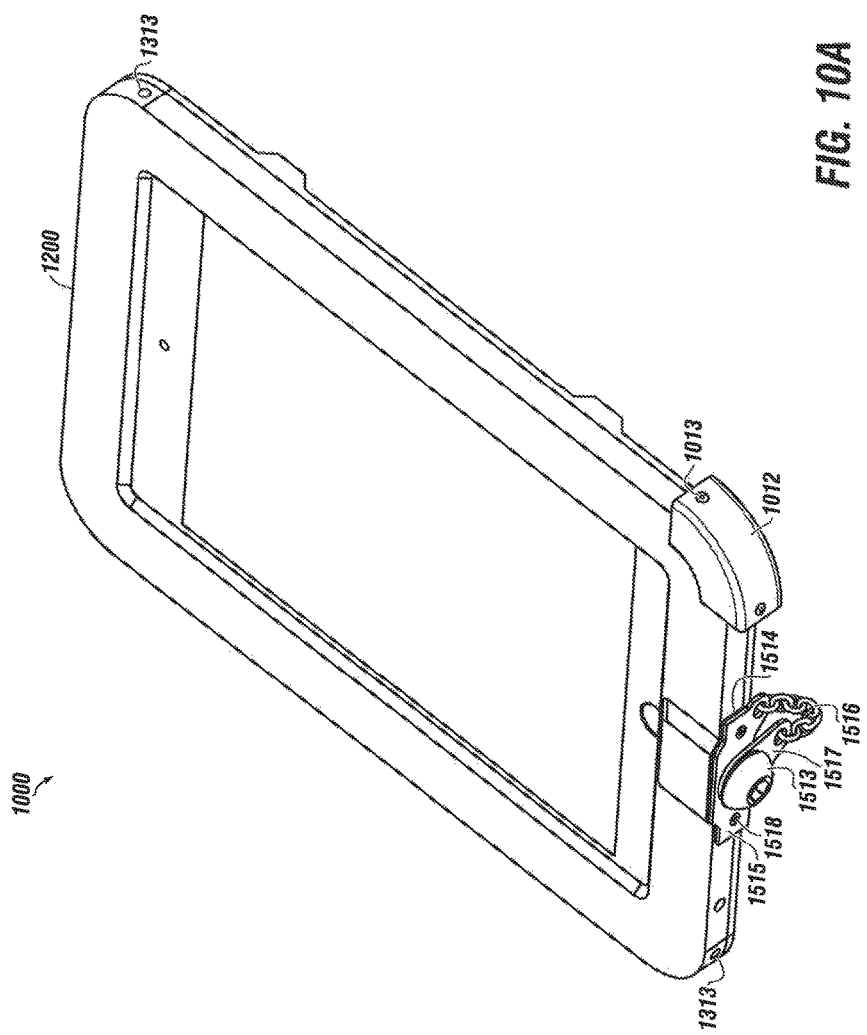

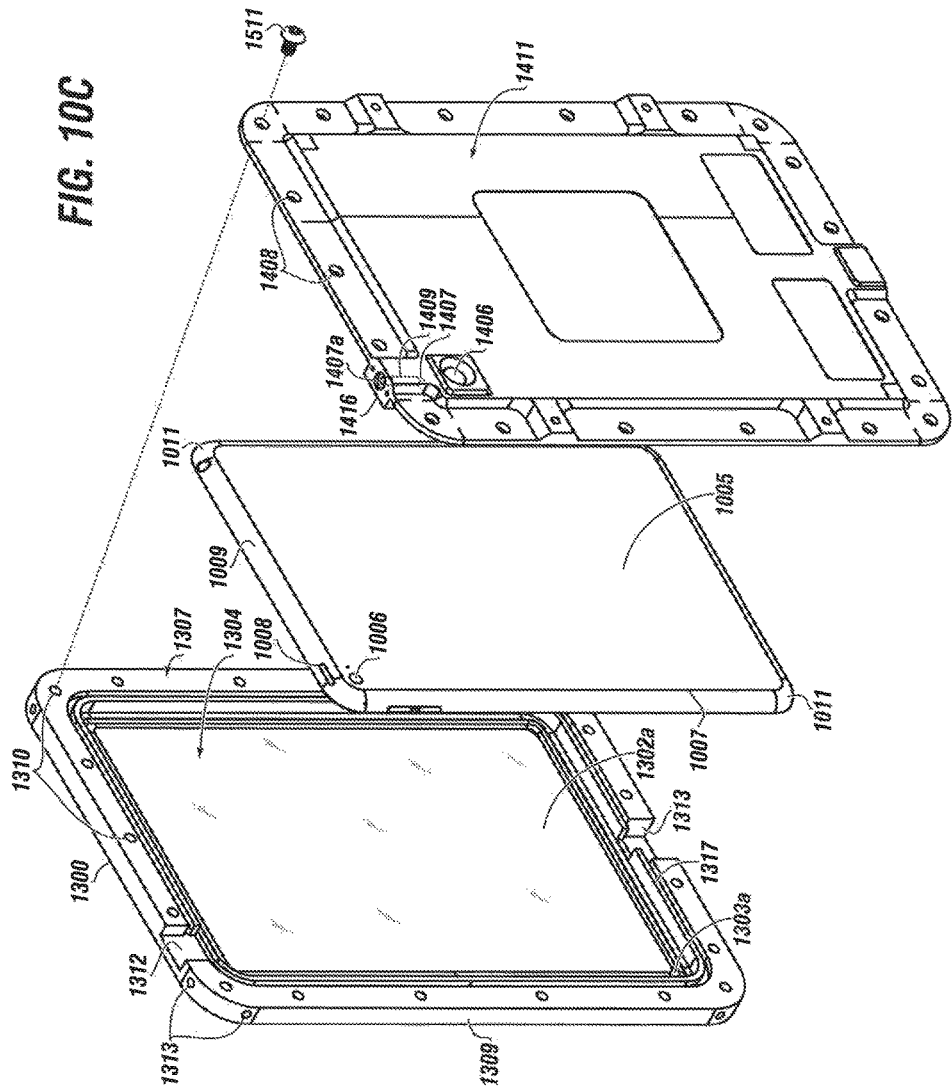

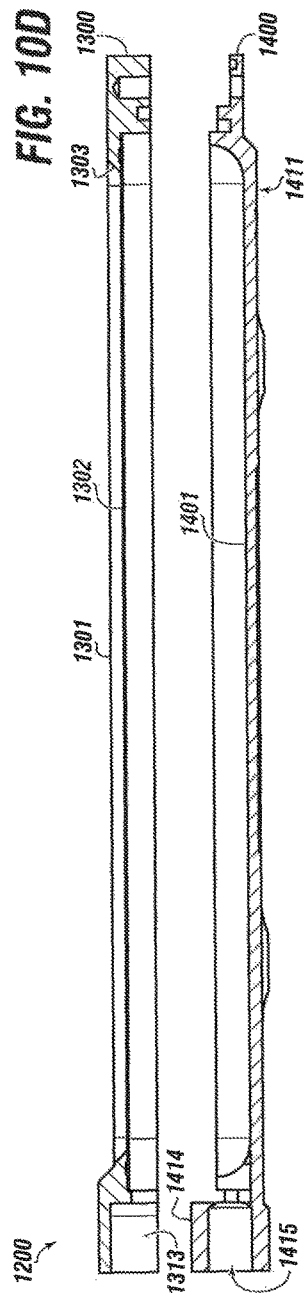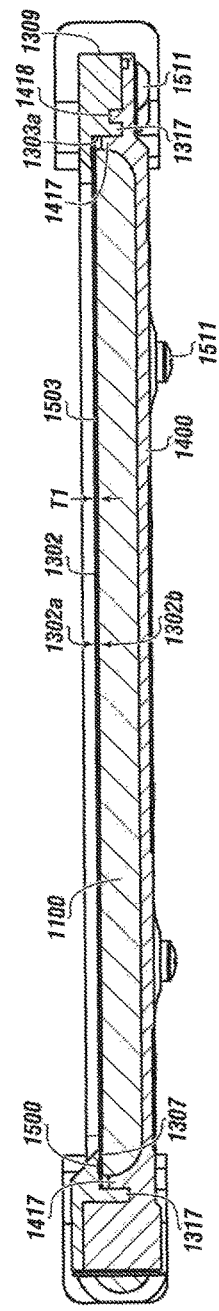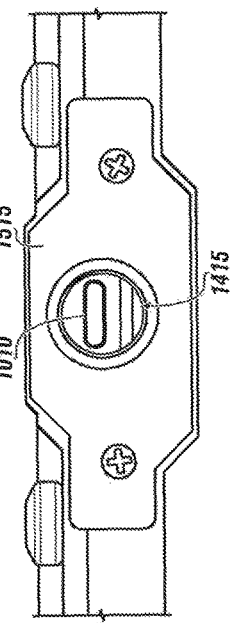

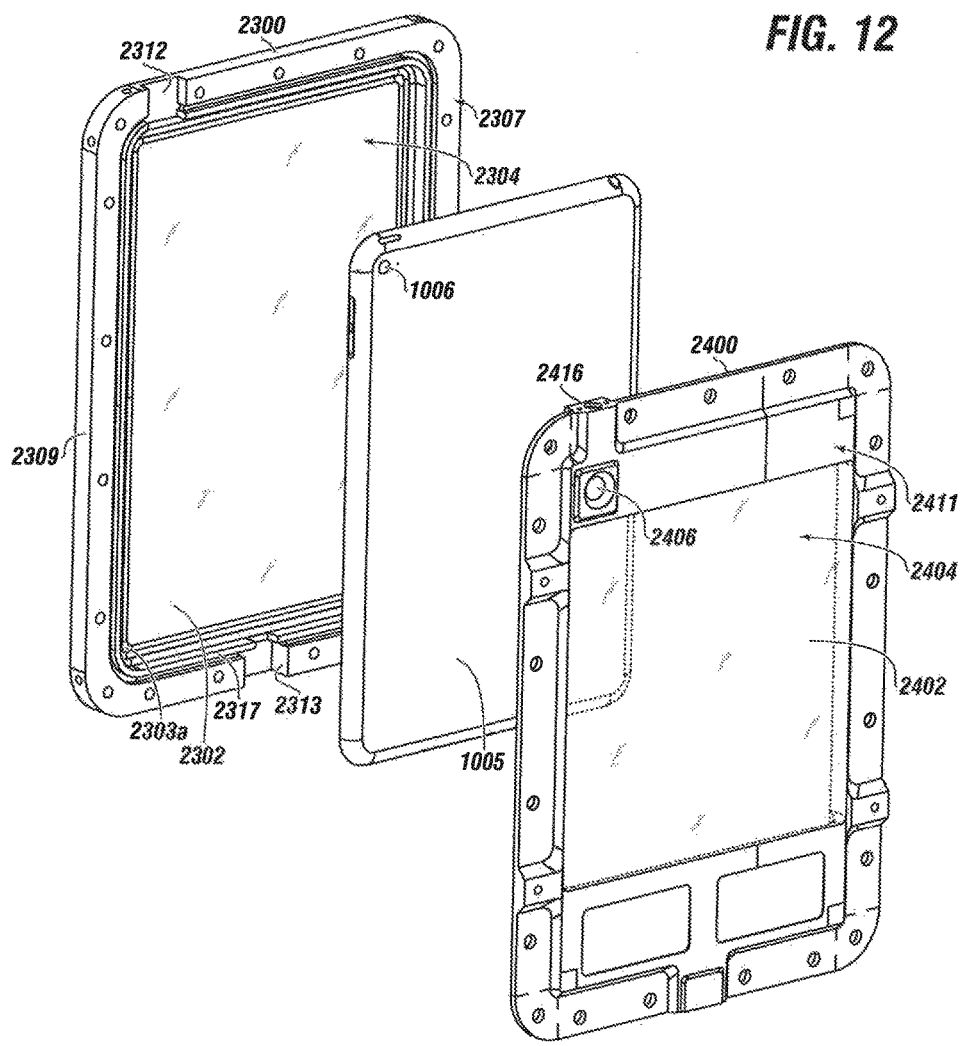

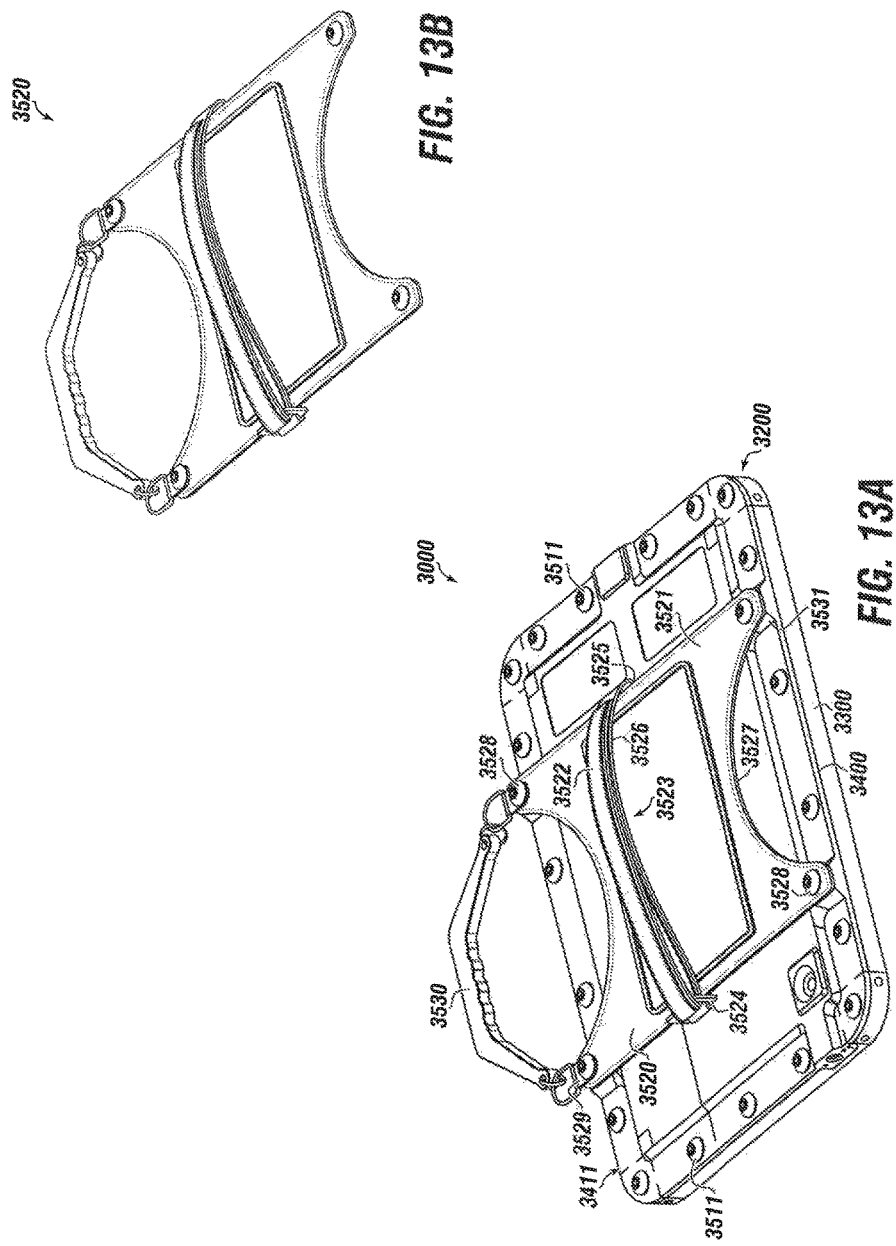

EXPLOSION PROOF ASSEMBLY

CROSS-REFERENCE TO RELATED APPLICATIONS

This application is a continuation of U.S. non-provisional application Ser. No. 15/798,080, filed Oct. 30, 2017. The entirety of each application is incorporated herein by reference for all purposes.

STATEMENT REGARDING FEDERALLY SPONSORED RESEARCH OR DEVELOPMENT

Not Applicable.

BACKGROUND

Background of the Disclosure

The use of electrical devices in hazardous areas may lead to an increased risk of a fire or explosion triggered by the presence of the electrical device. For instance, an electrical device may serve as an ignition source in a hazardous area containing flammable gasses, vapors or dust. For this reason, electrical devices used in hazardous areas are often required to be certified according to the requirements specified in that particular jurisdiction. Further, often the types of protections required vary depending on the risks and hazards involved.

Hazardous environments have been categorized and regulated, but the specific classification, regulating, and governing thereof depends on jurisdiction. Electrical codes and standards for hazardous areas are generally understood as having two distinct paths. In North America, a 'Class, Division' system has been utilized, whereas other parts of the world use a 'Zone System' based predominantly on standards from the International Eletrochemical Commission (IEC) and European Community for Electrotechnical Standardization (CENELEC). A main difference is in the Zone system is that the level of hazard probability is divided into three 'zones' as opposed to two 'divisions'

The types of hazardous environments are broken down into three classes, with each class focusing on different types of hazardous materials in the surrounding atmosphere. For instance: Class I areas include flammable gasses or vapors present in the air in sufficient quantities to produce an explosion in the presence of an ignition source; Class II areas include the presence of combustible dusts; and Class III areas include ignitable fibers or other materials too heavy to be suspended in the air in sufficient quantities to produce an ignitable mixture (e.g., wood chips, cotton, nylon, etc.).

Two common types of hazardous areas requiring protection for electrical devices are areas that contain flammable vapors and areas containing dust or other particulates susceptible to ignition. Further, each class is divided into two divisions based on the probability of hazardous materials being present in an ignitable or combustible concentration in the surrounding air. Division 1 defines hazardous environments where the pertinent hazardous material (e.g., vapors, dust, fibers) is present during normal conditions. Division 2 defines hazardous environments where the pertinent hazardous material is present only in abnormal or fault conditions (e.g., in the event of a container failure or other leak).

Regarding Class I hazardous environments involving flammable vapors, an electrical device may be used in such an area via an explosion proof enclosure or assembly configured to keep an internal explosion within the explosion proof enclosure from escaping outward, where it would ignite vapors outside of the enclosure. Thus, with regard to environments having flammable vapors, explosion proof assemblies are designed to both reduce the entry of flammable materials into the enclosure and also, in the event of an explosion within the enclosure, to prevent the escape of hot or burning material from escaping the enclosure.

Regarding Class II hazardous environments involving ignitable dusts and particulates, an electrical device may be used in such an area via a dust-ignition proof enclosure or assembly that is configured to prevent ignitable materials from entering the enclosure and by containing any arcs, sparks or heat within the enclosure that may ignite dust or other particulates in the surrounding environment. Also, there exists assemblies and enclosures for use with an electrical device that are referred to as "intrinsically safe," where an intrinsically safe assembly including an electrical device is incapable of releasing sufficient electrical or thermal energy to cause ignition of a specific hazardous substance (i.e., Class I, Class II and Class III substances) under normal or abnormal conditions. Further, "non-incendive" components are non-sparking and can be used in Div1, Zone1 areas when coupled with explosion proof enclosure.

While assemblies or enclosures have been developed for use in hazardous areas, these components are often expensive and not configured for use with particular electrical devices. Also, these components may only satisfy the requirements for a particular class and division, and thus may not be used in other hazardous environments or in hazardous environments under abnormal conditions (i.e., Division 2 conditions). Further, these components may be permanently coupled to the protected electrical device, restricting the use of multiple electrical devices with the same enclosure. Thus, there is a need in the art for an intrinsically safe or explosion proof assembly and/or enclosure capable of being safely used in varying types of conditions hazardous environments. Also, it would be beneficial if such an enclosure was not permanently coupled to or formed integrally with the protected electrical device, allowing the use of different electrical devices with the same enclosure.

It should be noted that standards differ depending on what part of the world a user is in. It is desirous to have an explosion proof assembly for a mobile device capable of meeting stringent ATEX/IECEx (International Electrotechnical Commission) for zones 1 and 2, in addition to North America Class 1, Divisions 1 and 2 for safe operation around hazardous gas, vapor and dust-based atmospheres. This means any such assembly should be able to meet the most difficult part of any specification, which may be different by way of example each of ATEX, IECEx, and NA.

SUMMARY

Embodiments of the disclosure pertain to an explosion proof enclosure that may include a first portion that may further have a first portion rear face, a first portion outer edge, a first portion inner edge, a second dissipation wall, an isolator housing receptacle, a pin housing receptacle, and a window; an outer touchscreen adhesively sealed around a perimeter of the first portion rear face; a second portion releasably coupled to the first portion, the second portion may further have a second portion inner surface defined by a second portion inner edge that transitions into a first dissipation wall, an isolator housing, and a pin housing.

Other embodiments of the disclosure pertain to an explosion proof assembly that may include a first portion releasably coupleable to a second portion. The first portion may include any of a first portion rear face, a first portion outer edge, a first portion inner edge, a second dissipation wall, a pin housing receptacle, and a window. There may be an outer touchscreen adhesively sealed around a perimeter of the first portion rear face. The second portion may include any of a second portion inner face, a pin housing, and a second portion inner surface defined by a second portion inner edge that transitions into a first dissipation wall. The second portion may include a third dissipation wall.

Coupling of the portions may form an enclosure. The first portion and the second portion are releasably coupled to each other to form the enclosure. There may be a mobile device within the enclosure. The mobile device may be disposed between the window and the second portion inner face. The mobile device may be operable via a mobile device touchscreen.

The pin housing may mate within the pin housing receptacle. Upon assembly the outer touchscreen may be engaged with the mobile device touchscreen and/or the outer touchscreen may be transmissive to the mobile device touchscreen.

In aspects, the second dissipation wall may be adjacent to the first dissipation wall. The second dissipation wall may be adjacent to the third dissipation wall. The second dissipation wall may be adjacent to each of the first and third dissipation walls.

The mobile device may have an on-off button. The pin housing may include a movable pin. Upon assembly, the movable pin may be aligned with the on-off button. In aspects, depressing of the movable pin may results in depressing the on-off button.

The first portion may include a plurality of first mating apertures. The second portion may include a plurality of second mating apertures corresponding to the plurality of first mating apertures. One or more of any respective first mating aperture and second mating aperture may have a fastener disposed therein. Any respective fastener may be tightened, such as to a torque value in the range of about 3 Newton meter to about 7 Newton meter.

The mobile device may be configured for taking photos via a camera lens. The second portion may include a lens window. Upon assembly the camera lens and the lens window may be aligned.

The mobile device may be configured for taking photos via a camera lens. The second portion may include a lens window. Upon assembly the camera lens and the lens window may be aligned. The mobile device may be configured for electromagnetic wireless recharging functionality. The second portion may include a second portion window sealingly closed off.

Upon coupling the assembly may be configured to at least partially dissipate a flame resultant from an explosion of the mobile device.

Other embodiments herein pertain to an explosion proof enclosure having a mobile device therein, thereby forming an assembly.

The enclosure may include a first portion having any of a first portion rear face, a first portion outer edge, a first portion inner edge, a second dissipation wall, a pin housing receptacle, and a window. There may be an outer touchscreen adhesively sealed around a perimeter of the first portion rear face. The enclosure may include a second portion having nay of a second portion inner face, a pin housing, a second portion inner surface defined by a second portion inner edge that transitions into a first dissipation wall, and a third dissipation wall.

The mobile device may be disposed between the window and the second portion inner face. The mobile device may be operable via a mobile device touchscreen. The first portion and the second portion may be releasably coupled to each other to form an enclosure.

The second dissipation wall may be adjacent to the first dissipation wall, and/or may be adjacent to the third dissipation wall.

The mobile device may be configured for electromagnetic wireless recharging functionality. The second portion may include a second portion window sealingly closed off.

Still other embodiments of the disclosure pertain to an explosion proof assembly that may include a first portion having any of a first portion rear face, a first portion outer edge, a pin housing receptacle, a first portion inner edge, a second dissipation wall, and a window. There may be an outer touchscreen adhesively sealed around a perimeter of the first portion rear face.

The second portion may be releasably coupled to the first portion to form an enclosure. The second portion may include any of a pin housing, a second portion inner surface defined by a second portion inner edge that transitions into a first dissipation wall extending substantially therearound, and a third dissipation wall. There may be a mobile device disposed within the enclosure. The mobile device may be operable via a mobile device touchscreen.

Upon coupling the assembly may be configured to at least partially dissipate a flame resultant from an explosion of the mobile device prior to any portion of the flame exiting the assembly.

These and other embodiments, features and advantages will be apparent in the following detailed description and drawings.

BRIEF DESCRIPTION OF THE DRAWINGS

A full understanding of embodiments disclosed herein is obtained from the detailed description of the disclosure presented herein below, and the accompanying drawings, which are given by way of illustration only and are not intended to be limitative of the present embodiments, and wherein:

FIG. 1A shows a front exploded or disassembled view of an embodiment of an explosion proof tablet assembly according to embodiments of the disclosure;

FIG. 1B shows a rear exploded or disassembled view of an embodiment of an explosion proof tablet assembly according to embodiments of the disclosure;

FIG. 2A shows a front view of the explosion proof tablet assembly of FIG. 1A in an assembled configuration according to embodiments of the disclosure;

FIG. 2B shows a back view of the explosion proof table assembly of FIG. 1A in an assembled configuration according to embodiments of the disclosure;

FIG. 7 shows a zoomed-in view of an enclosure of the explosion proof table assembly of FIGS. 6A and 6B according to embodiments of the disclosure;

FIG. 8 shows a zoomed-in view of an enclosure of the explosion proof table assembly of FIGS. 6A and 6B according to embodiments of the disclosure;

FIG. 10A shows a frontward isometric view an explosion proof assembly according to embodiments of the disclosure;

FIG. 10C shows a rearward isometric component breakout view of the assembly of FIG. 10 according to embodiments of the disclosure;

FIG. 10D shows a side cross-sectional view of an unassembled enclosure according to embodiments of the disclosure;

FIG. 10E shows a side cross-sectional view of an assembled enclosure having a mobile device therein according to embodiments of the disclosure;

FIG. 10F shows a side view of an input connector of a mobile device accessible through an isolator bore of an explosion proof assembly according to embodiments of the disclosure;

FIG. 12 shows a back isometric component breakout view of an explosion proof assembly having a modified second portion according to embodiments of the disclosure;

FIG. 13A shows a top view of a hand-held accessory releasably coupled to a rear side of an explosion proof assembly according to embodiments of the disclosure;

FIG. 13B shows a top view of the hand-held accessory of FIG. 13A according to embodiments of the disclosure;

DETAILED DESCRIPTION

Figure 3:
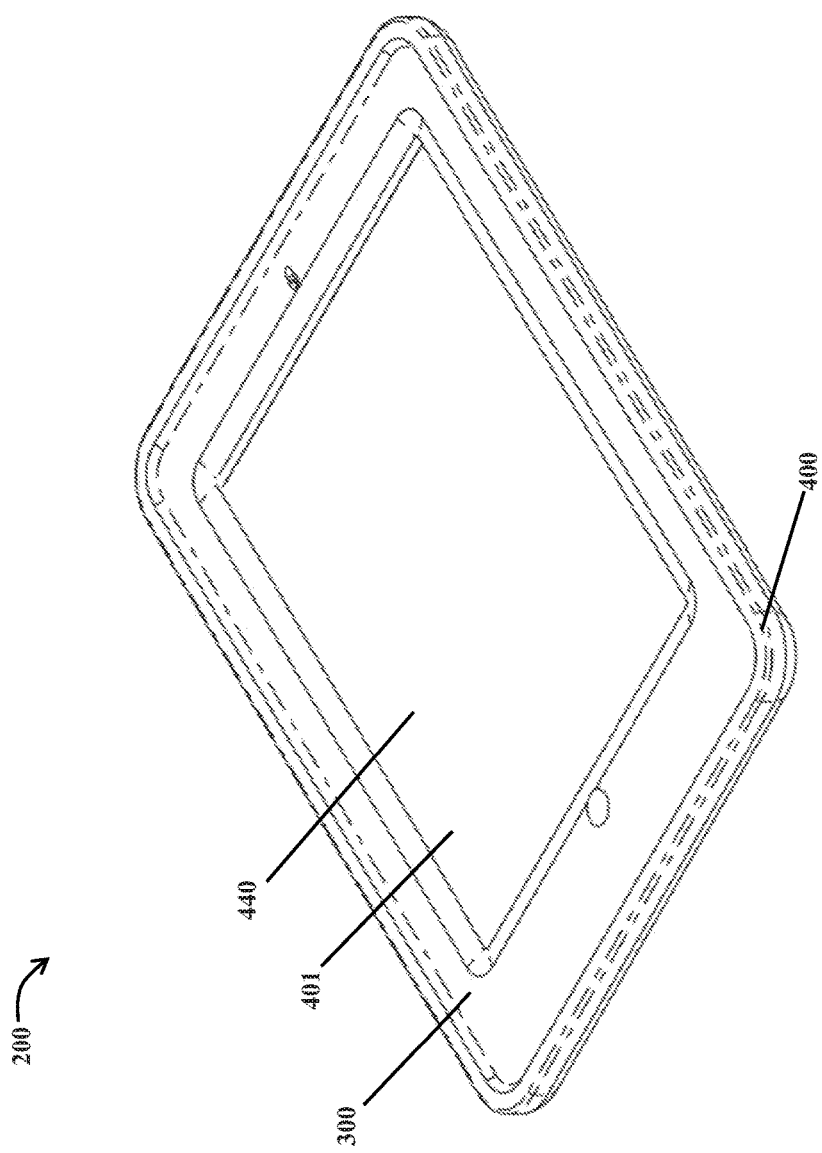
FIG. 3 shows a perspective view of an enclosure of the assembly of FIG. 1A in an assembled configuration according to embodiments of the disclosure.

Herein disclosed are novel apparatuses, systems, and methods that pertain to an explosion proof assembly, details of which are described herein.

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," "right", "left", "down", etc., are used for convenience and to refer to general direction and/or orientation, and are only intended for illustrative purposes only, and not to limit the disclosure.

Connection(s), couplings, or other forms of contact between parts, components, and so forth may include conventional items, such as lubricant, additional sealing materials, such as a gasket between flanges, o-rings, PTFE between threads, and the like. The make and manufacture of any particular component, subcomponent, etc., may be as would be apparent to one of skill in the art, such as molding, forming, machining, additive manufacturing, etc. Embodiments of the disclosure provide for one or more components to be new, used, and/or retrofitted to existing machines and systems. One or more components may be made from a metallic material, such as stainless steel, aluminum, metal alloy, etc.

The various characteristics mentioned above, as well as other features and characteristics described in more detail below, will be readily apparent to those skilled in the art upon reading the following detailed description of the embodiments, and by referring to the accompanying drawings.

Terms

The term "connected" as used herein can refer to a connection between a respective component (or subcomponent) and another component (or another subcomponent), which can be fixed, movable, direct, indirect, and analogous to engaged, coupled, disposed, etc., and can be by screw, nut/bolt, weld, and so forth. Any use of any form of the terms "connect", "engage", "couple", "attach", "mount", etc. or any other term describing an interaction between elements is not meant to limit the interaction to direct interaction between the elements and may also include indirect interaction between the elements described.

The term "fluid" as used herein can refer to a liquid or gas and is not solely related to any particular type of fluid such as hydrocarbons.

The terms "pipe", "conduit", "line" or the like as used herein can refer to any fluid transmission means, and can be tubular in nature.

The term "combustion" as used herein can refer to an exothermic reaction between a fuel and an oxidant that can result in the production of a flame (the visible part of a fire) and a gaseous product.

The term "explosion" as used herein can refer to a combustion in the form of a release of energy in an extreme manner, usually with the generation of high temperatures and the release of gases. An explosion can produce a flame, heat, a shock wave, a pressure wave, or other effects. An explosion can be referred to as a form of combustion.

The term "flame" as used herein can refer to the visible part of a fire. Flame can refer to a product of a combustion reaction emitting visible, infrared, and sometimes ultraviolet light, the frequency spectrum of which depends on the chemical composition of the burning material and intermediate reaction products.

The term "explosion proof assembly" as used herein can refer to an assembly that can adequately prevent an explosion in an environment external to the assembly as a result of an explosion or ignited fire within the assembly.

The term "flame extinguishing enclosure" as used herein can refer to an assemblable enclosure that upon proper coupling together provides or otherwise configures the enclosure with a flame path that is suitable to extinguish (or quench, etc.) a flame that results from a combustion, explosion, or other form of ignited fire from within the enclosure. The term can be further in reference to accomplishing a desired configuration and result in light of certain industry, standards, specifications, requirements, etc. The term "flame dissipating" can be analogous to flame extinguishing.

The term "flame path" as used herein can refer to a spatial region of some amount of direction and/or distance (linear or non-linear) within an explosion proof assembly where a flame may traverse. The explosion proof assembly can be configured in a manner to provide a suitable flame path that ultimately results in the extinguishing of the flame before it (or any part thereof) can leave or otherwise exit the assembly.

The term "transmissive" as used herein can refer to the ability of a material to pass a signal therethrough. For example, a touchscreen of an explosion proof assembly can be transmissive of a signal created by human touch thereto to a touchscreen of a mobile device retained within the assembly that is in contact with therewith. This can occur, for example, by changing an electrical property of both the touchscreens, such as resistance or capacitance.

The term "CNC machined" can refer to a computer numerical control (CNC) process whereby a robot or machinist runs computer-operated equipment to create machine parts, tools and the like.

The embodiments described herein include an explosion proof assembly that includes a tablet computer having a touch screen, such as the iPad® or iPhone produced by Apple, Inc. Particularly, the explosion proof assembly includes a tablet computer or phone disposed within a removably coupled enclosure. The enclosure allows for the use of the tablet computer or phone in hazardous areas including flammable vapors and ignitable dust, corresponding to Class 1 Div2 Class II Div 2, Class 1 Div I, Class 2 Div I, Zone2, Zone22, Zone1 and Zone21 areas. Also, the enclosure allows for the use of the tablet or phone in hazardous areas during Zone/Division 1, 2 conditions. Further, the assembly is configured to be non-incentive such that the assembly does not allow for the release of any sparks or electrical/thermal energy sufficient to cause ignition of hazardous substances in the surrounding environment.

In an embodiment, a non-incentive, non-modified tablet computer or phone (e.g., iPad2, iPad3, etc.) with an accompanying enclosure is provided that allows a user to operate the tablet in hazardous environments, including Class I/Division 2, Class II/Division 2, Class I/Division 1, Class II/Division 1, ATEX Zone 2, Zone 1 and IECEx classified areas.

Referring initially to FIGS. 1A-1B, an explosion proof assembly 10 is shown in an exploded or disassembled configuration and generally includes a tablet computer or phone 100 and an enclosure 200 having a first or upper portion 300 that is releasably coupled to a second or lower portion 400. In this embodiment, tablet 100 is an iPad® produced by Apple, Inc. However, in other embodiments tablet 100 may comprise other varying types and styles of tablet computers or phones, including but not limited to those from other manufacturers. In this embodiment, enclosure 200 is formed from milled aluminum satisfying the NEMA 4 standard.

However, in other embodiments enclosure 200 may be formed from other rugged materials. Tablet 100 has a flat front face 101 defined by a front outer edge 103, which includes a touch screen 102. Tablet 100 also includes a flat rear face 105 that is defined by a rear outer edge 107. Extending between front outer edge 103 and rear outer edge 107 is a chamfered surface 109 having four chamfered corners 111. Tablet 100 also includes a first button 104 (home button) disposed on front face 101, a camera lens 106 disposed on rear face 105 and a second button 108 (on/off button) disposed on chamfered edge 109. An input connector 110 is disposed on chamfered surface 109. Input connector 110 is configured to allow for data and/or electrical power transfer between tablet 100 and an external electrical device.

Referring now to FIGS. 1A-1B and 2A-2B, while FIGS. 1A-1B show assembly 10 in an exploded or disassembled configuration, FIGS. 2A-2B show assembly 10 in a closed or assembled configuration where there is no wiring or other conductor exposed to the surrounding environment. Regarding enclosure 200, first portion 300 includes a flat front face 301 having a central window 302 extending therethrough that is defined by an outer edge 303. Extending from face 301 is a curved outer surface 305 that extends around face 301. A first aperture 304 and a second aperture 306 are also disposed on front face 301 and extend therethrough. Thus, first aperture 304 provides a means for actuating first button 104 disposed on front face 101 of tablet 100. Also, second aperture 306 provides a window for a front cameral 12 (FIG. 2A) of tablet 100, that may be disposed on front face 101 of tablet 100.

First portion 300 also includes a flat rear face 307 (FIG. 1B) disposed opposite of front face 301 and having a sealing surface 308 that extends from face 307. Sealing surface 308 extends between an outer edge 309 and the outer edge 303 of window 302. Surface 308 is configured to sealingly engage the front face 101 of tablet 100 so as to prevent or at least substantially restrict fluids or particles (e.g., dust, particulates, fibers, etc.) from entering or exiting enclosure 200 when assembly 10 is in its assembled configuration (FIGS. 2A-2B). Sealing surface 308 also includes a first portion 308*a* that extends about first aperture 304 and a second portion 308*b* that extends about second aperture 306. Extending from curved surface 305 is a sealing mechanism 320, which is configured to seal against a corresponding sealing assembly 420 of second portion 400 when first portion 300 and second portion 400 are coupled to each other.

Second portion 400 includes an inner flat face 401 defined by a rectangular outer edge 402. Extending from edge 402 of face 401 is an inner chamfered surface 403 extending about inner face 401 and having four chamfered corners 405. Portion 400 also includes a flat outer face 411 defined by an outer edge 404. Extending from edge 404 is an outer chamfered surface 407 that extends about outer face 411 and has four chamfered corners 409. Sealing mechanism 420 is disposed between inner chamfered surface 403 and outer chamfered surface 407.

A ledge 408 extends from chamfered outer surface 407 and includes an aperture 410, allowing access to actuate second button 108 of tablet 100. Referring briefly to FIG. 3, enclosure 200 in the assembled configuration includes an internal chamber 440 disposed between first section 300 and second section 400. Sealing assemblies 320, 420, and sealing surface 308 of portion 300 are configured to seal internal chamber 440 from the external environment once tablet 100 has been disposed in chamber 440, as shown in FIGS. 2A-2B.

Figure 5:
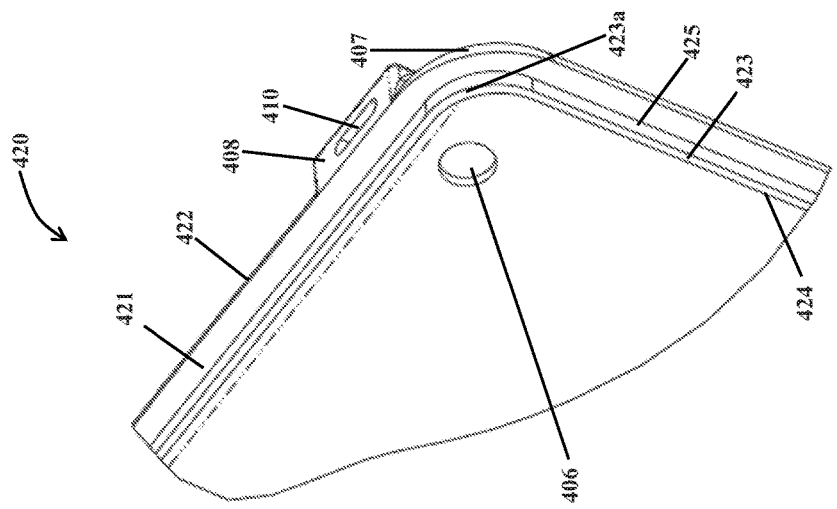
FIG. 5 shows a rear-side zoomed-in view of an enclosure of the explosion proof table assembly of FIG. 1A according to embodiments of the disclosure.
Figure 4:
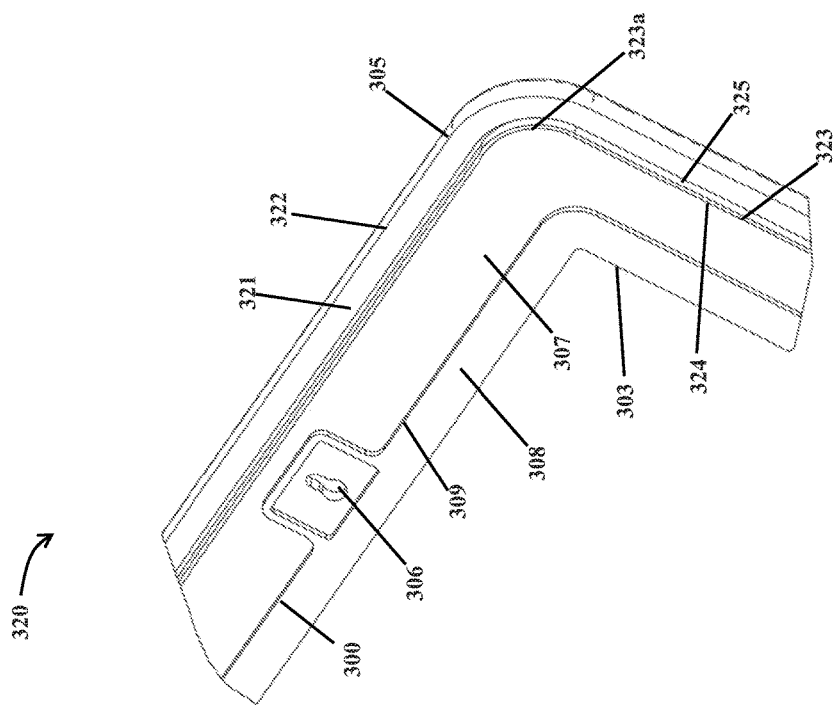
FIG. 4 shows a front-side zoomed-in view of an enclosure of the explosion proof table assembly of FIG. 1A according to embodiments of the disclosure.

Referring now to FIGS. 4 and 5, sealing mechanism 320 of first portion 300 includes an inner surface 321 that extends from an outer edge 322 of curved surface 305. Mechanism 320 also includes a tab 323 that extends inward (relative to second portion 400) from surface 321. Tab 323 includes four rounded corners 323a and has a vertical inner surface 324 and an oppositely disposed vertical outer surface 325. Correspondingly, sealing mechanism 420 of second portion 400 includes an inner surface 421 that extends from an outer edge 422 of chamfered surface 407. Mechanism 420 also includes a tab 423 that extends inward (relative to first portion 300) from surface 421. Tab 423 includes four rounded corners 423a and has a vertical inner surface 424 and an oppositely disposed vertical outer surface 425.

When assembly 10 is in the assembled configuration, as shown in FIGS. 2A-2B, outer surface 325 of tab 323 is configured to sealingly engage inner surface 424 of tab 423, thus preventing or at least substantially restricting fluids or particles (e.g., dust, particulates, fibers, etc.) from entering or exiting enclosure 200 when assembly 10 is in its assembled configuration. First portion 300 and second portion 400 may be releasably coupled to each other by mechanical means, such as evenly distributed bolts or screws extending through curved surface 305 of first portion 300 and chamfered surface 407 of second portion 400. An adhesive or other substance may also be disposed on either surface 321 of portion 300 or on surface 421 of portion 400, thus causing portions 300 and 400 to adhere to each other upon assemblage.

Figure 6B:
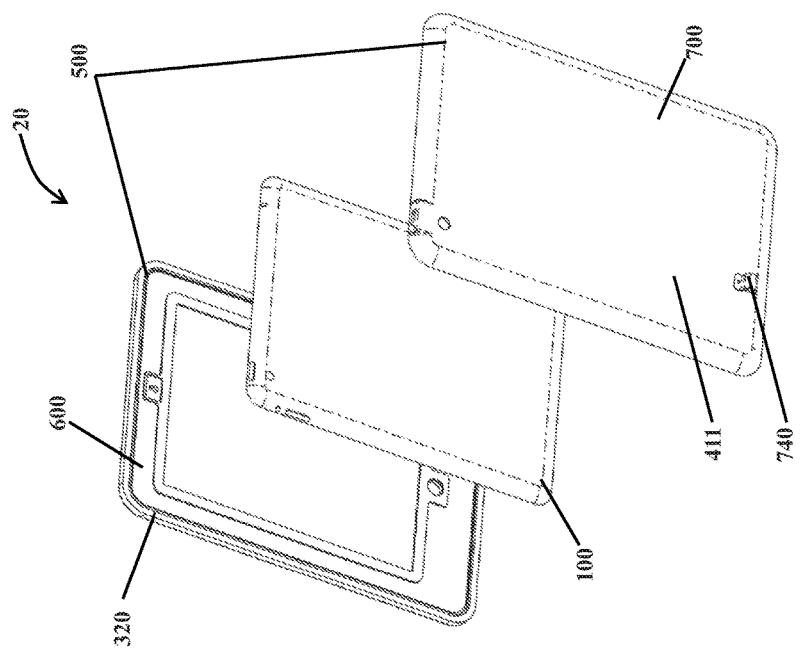
FIG. 6B shows a rear-side exploded view of another embodiment of an explosion proof tablet assembly according to embodiments of the disclosure.
Figure 6A:
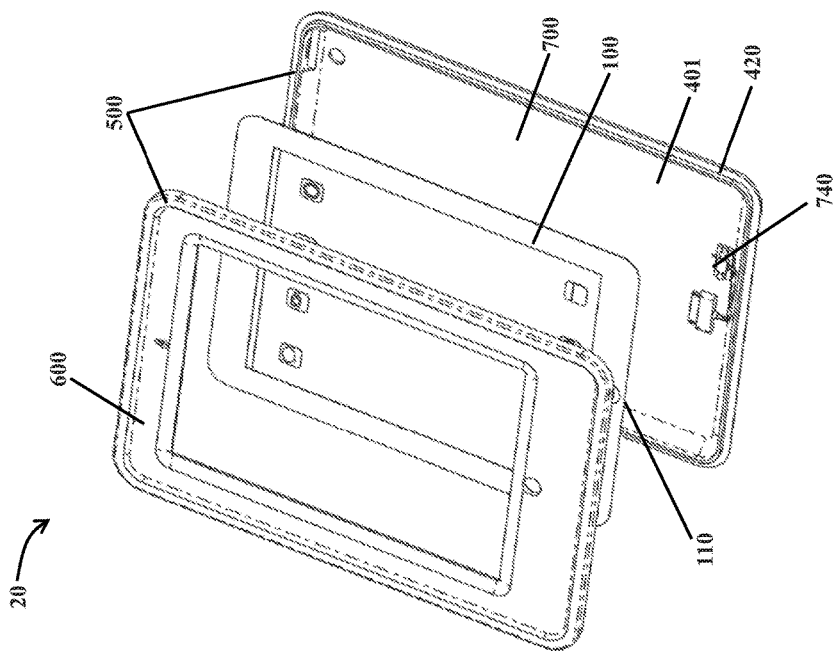
FIG. 6A shows a front-side exploded view of another embodiment of an explosion proof tablet assembly according to embodiments of the disclosure.

Referring now to FIGS. 6A and 6B, another embodiment includes an explosion proof assembly 20 that generally includes tablet 100 and an enclosure 500 having a first portion 600 and a second portion 700. Enclosure 500 includes similar features as enclosure 200 and thus identical features are numbered similarly. In this embodiment, enclosure 500 is formed from milled aluminum satisfying the NEMA 4 standard. However, in other embodiments enclosure 500 may be formed from other rugged materials. As with assembly 10, when assembly 20 is in the assembled configuration there is no wiring or other conductor exposed to the surrounding environment, as will be explained further herein. In this embodiment, second portion 600 includes a data and/or recharging interface 740 coupled to inner face 401 and outer face 411 of portion 600.

Referring now to FIGS. 7 and 8, data interface 740 generally includes a cable 742 having a first end 742a coupled to a first connector 744 and a second terminal end 742b coupled to a second connector 750. First connector 744 is a 30-pin dock connector configured to electrically couple with input connector 110 of tablet 100 (FIGS. 5A and 5B). Second connector 750 is a universal serial bus (mini-USB) connection port having an opening 752 disposed on surface 411, which is coupled to second portion 400 by two screws 751 extending into surface 401. Thus, when assembly 20 is in an assembled configuration (similar to the assembled configuration of assembly 10 shown in FIGS. 2A-2B), connector 744 is coupled to input 110, establishing an electrical connection between tablet 110 and USB port 750, which may be accessed by an external cable. A dust cap 753 is disposed on surface 411 and is coupled to surface 411 via a flange 754 and screw 755 that extends through flange 754 and into surface 411 of portion 400. A cap portion 756 is disposed directly over opening 752 to prevent dust, fibers and other matter from contacting any pins or other electrical connectors within opening 752 of port 750. In order to access opening 752 of port 750, cap 753 may be rotated about screw 755, such as to expose opening 752 to allow for the insertion of a male connector (FIG. 7 shows cap 753 in the covered position).

Figure 9:
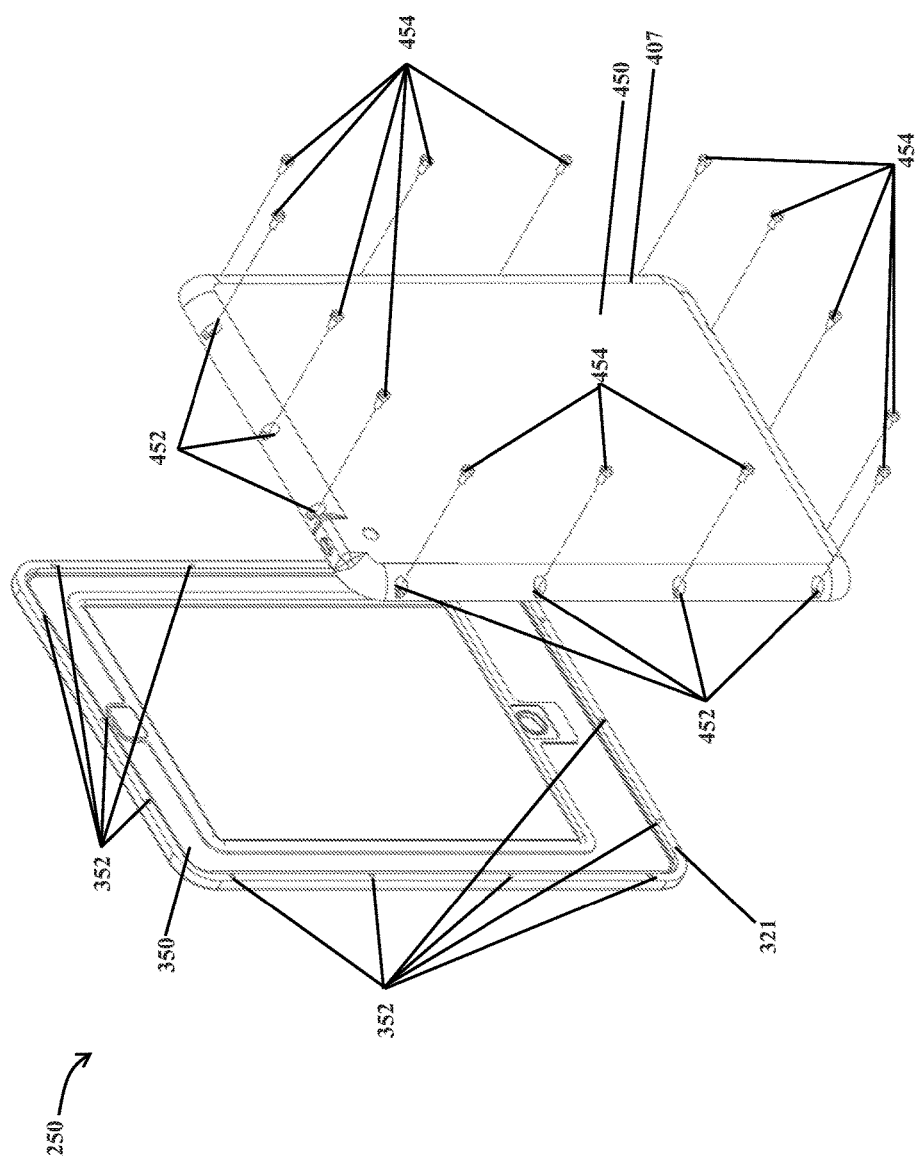
FIG. 9 shows another embodiment of an explosion proof enclosure according to embodiments of the disclosure.

Referring now to FIG. 9, another embodiment includes an enclosure 250 configured for use in an explosion proof assembly (e.g., assembly 10). Enclosure 250 includes similar features as enclosure 200 and thus identical numerals are numbered similarly. Enclosure 250 includes a first portion 350 and a second portion 450, where portions 350 and 450 are configured to releasably couple to each other via a plurality of screws 454 Inner surface 321 of first portion 350 and chamfered surface 407 of second portion 450 each include an evenly distributed plurality of apertures 352, 452, respectively, for receiving the plurality of screws 454.

Referring to FIGS. 1-5, a method of forming explosion proof assembly 10 generally includes placing or disposing tablet 100 within the second portion 400 of enclosure 200 and sealing tablet 100 within enclosure 200 by coupling first portion 300 with second portion 400. Once coupled, assembly 10 is in the assembled configuration such that assembly 10 satisfies the requirements of Class I, Division 2 and Class II, Division 2 hazardous area classifications. Also, touch screen 102 of tablet 100 may be safely actuated within Class I, Division 2 and Class II, Division 2 hazardous areas without violating the safety requirements of these areas. In other words, the assembly 10 includes an explosion-proof sealing or compartment for the enclosed tablet.

In the embodiment of FIGS. 1-5, placing tablet 100 within second portion 400 includes disposing tablet 100 such that the flat rear face 105 of tablet 100 is aligned with and/or engages the inner flat face 401 of second portion 401 of second portion 400. Also, chamfered surface 109 and corners 111 of tablet 100 are aligned with and/or engage chamfered surface 403 and corners 405 of portion 400. Coupling first portion 300 with second portion 400 of enclosure 200 includes aligning and engaging the sealing mechanism 320 of portion 300 with the sealing mechanism 420 of second portion 400, such that inner surface 321 engages inner surface 421 and outer surface 325 of tab 323 engages surface 424 of tab 423.

In the embodiment shown in FIG. 9, coupling the first portion 300 to the second portion 400 further includes extending the plurality of screws 454 through the plurality of apertures 352 and 452. However, in other embodiments coupling portions 300 and 400 may include disposing an adhesive on one or more of the surfaces of either sealing mechanism 320, 420, respectively. In this embodiment, engagement between mechanisms 320 and 420 of enclosure 200 creates a seal satisfying the IP67 standard. However, in other embodiments the seal may satisfy other standards such as IP68 or IP65, etc. In some embodiments, an explosion-proof sealing or compartment is provided thereby.

Referring now to FIGS. 6A-8, a method of forming explosion proof assembly 20 generally includes placing or disposing tablet 100 within the second portion 700 of enclosure 500 and sealing tablet within enclosure 500 by coupling first portion 600 with second portion 700. As with assembly 10, once coupled assembly 20 is in the assembled configuration and thus satisfies the requirements of Class I, Division 2 and Class II, Division 2 hazardous area classifications. Also, touch screen 102 of tablet 100 may be safely actuated within Class I, Division 2 and Class II, Division 2 hazardous areas without violating the safety requirements of these areas. Tablet 100 is disposed within portion 700 in a similar fashion to how tablet 100 is disposed within portion 400. However, in the embodiment of assembly 20, disposing tablet 100 within portion 700 further includes coupling connector 110 of tablet 100 with interface 740 of portion 700. Specifically, coupling connector 110 with interface 740 includes coupling connector 110 with first connector 744 of interface 740. Once coupled, an electrical signal may be communicated between tablet 100 and port 750.

As with enclosure 200 of assembly 10, portions 600 and 700 of assembly 20 are coupled in a similar fashion as portions 300 and 400 are coupled to form assembly 10 (e.g., sealing mechanisms 320, 420, respectively, of portions 600 and 700 are engaged with each other). Portions 600 and 700 may also be coupled via a plurality of screws (e.g., screws 454) that extend through apertures (e.g., apertures 352, 452) disposed in portions 600 and 700. In this embodiment, engagement between mechanisms 320 and 420 of enclosure 500 creates a seal satisfying the IP65 standard. However, in other embodiments the seal may satisfy other standards such as IP68 or IP65, etc.

Once assembly 20 is in the assembled configuration an electrical signal may be communicated between an external electrical device and tablet 100. A method for communicating a signal between an external device and tablet 100 includes rotating cap portion 756 of dust cap 753 about screw 755 such that opening 752 is exposed. Once opening 752 is exposed, a connector of the external device or conduit is coupled to port 750 of interface 740 such that an electrical signal may be communicated between tablet 100 and the external device or conduit. In this manner, tablet 100 may be safely recharged within enclosure 500 while assembly 20 is in a hazardous area (e.g., Class I, Division 2 and Class II, Division 2 areas).

Referring now to FIGS. 10A, 10B, 10C, 10D, 10E, and 10F together, a front isometric assembled view, a front isometric component breakout view, a back isometric component breakout view, an unassembled lateral cross-sectional view, an assembled lateral cross-sectional view, and a side view of an accessible input connector of a mobile device, respectively, of an explosion proof assembly, in accordance with embodiments disclosed herein, are shown.

As illustrated, explosion proof assembly 1000 may include a mobile device 1100 associated with a flame extinguishing enclosure 1200. The enclosure 1200 may include a first or upper portion 1300 configured for releasable coupling to a second or lower portion 1400. In aspects, the mobile device 1100 may be an iPad® or iPhone® produced by Apple, Inc., including the recent iPhone 8. However, the mobile device 1100 is not meant to be limited, and include other varying types and styles of computer-related devices, including but not limited to those from other manufacturers.

Embodiments herein provide for an explosion proof assembly 1000 configured to pass a 'resistance to impact' test in accordance with IEC 60079-0 (see Section 26.4.2 describing a drop-ball test). In the drop-ball test, an object, usually a ball of 1 kg mass, is dropped from a range of 0.2 m to 0.4 m. Accordingly, outer touchscreen 1302 must be configured to withstand the impact of the dropped ball without effecting the ability of assembly 1000 to be 'explosion proof'.

"Explosion proof" as referenced to the assembly 1000 may refer to the enclosure 1200, when assembled, being able to contain any explosion originating therein. The enclosure 1200, when assembled, may be configured and able to completely extinguish a flame generated from therein, such as from an explosion or other similar failure of mobile device 1100.

Enclosure 1200 may be formed from milled aluminum satisfying the NEMA 4 standard. However, in other embodiments enclosure 1200 may be formed from other rugged materials. Of significance, the explosion proof assembly 1000 may be configured for use in hazardous areas, including: North America Class I, Division 1; Class I, Division 2; Class II, Division 2 areas; and Class II, Division 1, and non-US Zone 2 and 1 ATEX and IECEx classified areas. As would be apparent to one of skill in the art, in order to certified by these bodies for satisfactory use within such a setting, various requirements must be met.

Standards pertain to impact, dropping, thermal conditioning (or endurance), thermal shock, temperature requirements, explosive pressure, overpressure, torque test, and so forth.

Figure 10B:
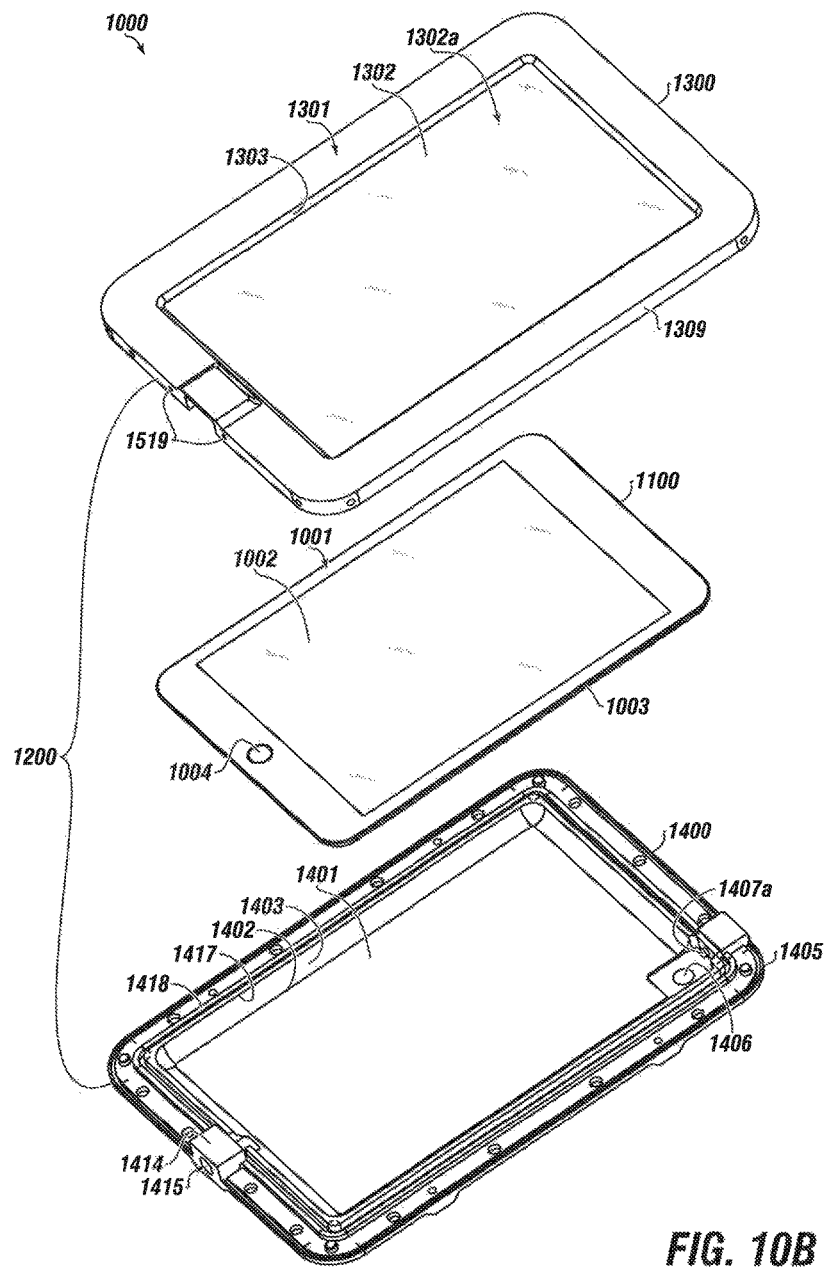
FIG. 10B shows a frontward isometric component breakout view the assembly of FIG. 10 according to embodiments of the disclosure.

FIGS. 10B and 10C together show assembly 1000 in a breakout view, while FIG. 10A shows assembly 1000 in a closed or assembled configuration where there is no wiring or other conductor exposed to the surrounding environment. When assembled the assembly 1000 may be configured for use in Class I, Division 1; Class I, Division 2; Class II, Division 2 areas; and Class II, Division 1, and non-US Zone 2 and 1 ATEX and IECEx classified areas.

The assembly 1000 may be configured for use in the setting when the upper portion 1300 is sealingly coupled with the lowered portion 1400, with the mobile device 1100 disposed therein. 'Sealingly coupled' may include the portions 1300, 1400 being sealingly engaged to certain specification, but some amount of disconnect is permissible. In this sense 'sealing' may refer to a metal-to-metal seal.

Regarding the enclosure 1200, the first portion 1300 may include a front face 1301. The first portion 1300 may include a rear face 1307 disposed opposite of front face 1301. The rear face 1307 may provide a suitable surface for sealing between the rear face 1307 and an outer touchscreen 1302. The surface for sealing may extend between an inner edge 1303 and a rear face inner edge 1303a, and therearound the rear face 1307. As would be apparent the first portion 1300 may thus have its 'window' (or opening) closed off by the presence of the outer touchscreen 1302.

The outer touchscreen 1302 may be a thin, flat piece of rigid and durable material suitable to meet various specifications identified herein. One of skill in the art would appreciate the outer touchscreen 1302 may be configured to withstand the aforementioned drop-ball test. Accordingly, the outer touchscreen 1302 may have a thickness T1 in the range of about 0.5 mm to about 1.2 mm. The thickness T1 may depend on the size of the touchscreen 1302, which may further depend on the particular mobile device desired for use.

The second portion 1400 may include a second portion inner face 1401. The inner face 1401 may be bordered by a second portion outer edge 1402. There may be an inner chamfered surface 1403 extending around the outer edge 1402. The inner surfaces of the second portion 1400 may be machined in a manner to accommodate to specification a particular mobile device. In this respect, chamfered or rounded surfaces may instead be linear.

The second portion 1400 may include a second portion rear outer face 1411. The rear outer face 1411 may be generally flat. The second portion 1400 may include one or more chamfered corners 1405, which may be configured to coincide with any respective chamfered corners of the first portion 1300 (as well as chamfered corners 1011 of the mobile device 1100).

The outer touchscreen 1302 may have a planar underside 1302a configured for complete transmissive mating and engagement with the touchscreen 1002 via contact point (or interface, layer, etc.) 1503. In this respect the assembly 1000 may provide the synergistic effect of being able to isolate effects of any internal explosion from the surrounding environment, and yet a user can still access and operate the touchscreen interface (and buttons 1004, 1008) of the mobile device 1100. One of skill would appreciate the contact point 1503 may be refer to a suitable amount of contact between the surface of the touchscreen 1002 and the outer touchscreen 1302, whereby the mobile device is accessibly operable via interfacing with the outer touchscreen.

The front face 1301 may have an outer perimeter surface edge 1309 that may extend at around the face 1301 and to the rear face 1307.

Referring particularly to the enclosure 1200 as shown in FIGS. 10C and 10D, the first portion 1300 may include the front face 1301, and the rear face 1307 disposed opposite of the front face 1301. The rear face 1307 may provide a suitable surface for sealing between the rear face 1307 and the outer touchscreen 1302. The surface for sealing may extend between an inner edge 1303 and the rear face inner edge 1303a, and therearound the rear face 1307.

As illustrated, the outer touchscreen 1302 may be adhesively and sealingly connected with the first portion 1300, such as via a layer of an adhesive 1500. The layer of adhesive 1500 may provide for a complete perimeter seal between the outer touchscreen 1302 and the first portion 1300. The adhesive may be suitable to withstand changes of significance in temperature, or chemicals, both from internal and external to the enclosure 1200.

The sealing engagement between the outer touchscreen 1302 and the first portion 1300 may be beneficial to so as to prevent or at least substantially restrict fluids or particles (e.g., dust, particulates, fibers, etc.) from entering or exiting the enclosure 1200 when the assembly 1000 is in its assembled configuration (e.g., FIG. 10A).

The second portion 1400 may include a second portion inner face 1401. The inner face 1401 may be bordered by a second portion outer edge 1402. There may be an inner chamfered surface 1403 extending around the outer edge 1402.

The second portion 1400 may include a second portion rear outer face 1411. The rear outer face 1411 may be generally flat. The inner face 1401 may trail off into a surface forming the first dissipation wall 1417, which may extend outward and upward from edge 1402, including in an arcuate manner, into proximate engagement with the outer touchscreen 1302. As shown, the first dissipation wall 1417 may be the first (lateral) contact point of any flame resulting from failure of the mobile device 1100.

The first portion 1300 may similarly have a second dissipation wall 1317. In the event of any remnant flame moving past the first dissipation wall 1417, the flame will be resisted from passing any further beyond the second dissipation wall 1317. As a further measure of added redundancy, the second portion may have a third dissipation wall 1418. One of skill would appreciate the first portion 1300 may have a grooved surface or region to accommodate mating with the first dissipation wall 1417 and the third dissipation wall 1418. And similarly the second portion 1400 may have a grooved surface or region to accommodate mating with the second dissipation wall 1318.

Referring again to FIGS. 10A-10F together, the surface edge 1309 of the first portion 1300 may be flat, planar, rounded, or any suitable shape, and is not meant to be limited. The surface edge 1309 may have one or more bumper mating holes 1313, whereby a respective bumper 1012 may be coupled therewith (via bumper couplers 1013, which may be screws). Accordingly, one or more bumpers 1012 (only one shown here) may be coupled to the enclosure 1200.

The bumper 1012 may be of a material suitable for providing extra protection to the mobile device 1100, particularly for shock absorption in the case of inadvertent dropping of the assembly 1000. Although not limited, the bumper 1012 may be made of rubber, plastic, silicone, or other comparable material. Moreover, although the Figures may illustrate one or more corner bumpers, the bumper 1012 could have other shapes, including being disposed around the entire perimeter (or in addition or alternatively to other portions) of the assembled enclosure 1200.

Of significance, the mating faces—namely rear face 1307 (including respective undulations, edges, and so forth) and inner surfaces 1401, 1402, 1403 (including respective undulations, edges, and so forth)—may be configured for sealing engagement therebetween. The sealing engagement may be metal-to-metal. In order to facilitate the flame extinguishing characteristic of the enclosure 1200, it is desirous to have significantly reduced separation between the corresponding mating surfaces of the first portion 1300 and the second portion 1400.

Any or both of the first portion 1300 and the second portion 1400 may be made from CNC machining.

In this respect, when the first portion 1300 and the second portion 1400 are coupled together, the distance between any respective and proximate surface of the portions 1300, 1400 may be less than about 0.05 inches. In aspects, the gap at any particular proximate contact point may be in the range of about 0.01 inches to about 0.05 inches. The use of an extremely tight or close tolerance seal around the portions 1300, 1400 is of significance in meeting specification for a certified explosion proof assembly.

The first portion 1300 may have one or more first mating apertures 1310. The first mating apertures 1310 may be configured for receiving respective fasteners 1511. In aspects, the fasteners 1511 may be screw-type fasteners. As a non-limiting example, the fasteners 1511 may be A2 Stainless M5×0.8×8 mm Torx head screws. The fasteners 1511 may be insertable through respective second portion apertures 1408. Although shown as being insertable through the second portion 1400 and threadingly into apertures of the first portion 1300, this configuration could just as well be reversed.

Although not limited to any particular arrangement or number, there may be sufficient placement and use of fasteners 1511 to promote or otherwise contribute to the desired tolerance fit between the first portion 1300 and the second portion 1400. The fasteners 1511 may be tightened to a fastener torque value in the range of about 3 N·m to about 8 N·m. In aspects, the fastener torque value may be at least 5 N·m. The fastener torque value may be in the range of about 5 N·m to about 6 N·m.

Mobile device 1100 may have a front face 1001 that may further include a front outer edge 1003, as well as an operable touch screen 1002. The mobile device 1100 may include a rear face 1005 that may be defined by a rear outer edge 1007. There may be a chamfered surface or edge 1009, which may extend between the outer edge 1003 and the rear outer edge 1007. In aspects, there may be one or more chamfered corners 1011.

The mobile device 1100 may include a first button 1004 (which may be a 'home' button or switch as would be understood by one of skill in the art) disposed on the front face 1001. There may be other buttons that provide various functionality based on user interaction, such as and a second button 1008 (which may be an 'on/off' button or switch as would be understood by one of skill in the art). The second button 1008 may be disposed on chamfered surface 1009. In accordance with embodiments herein the first button 1004 and the second button 1008 may be completely accessible and actuatable when the portions 1300, 1400 are coupled together.

The mobile device 1100 may include a camera lens 1006 (associated with respective camera circuitry), which may be disposed on the rear face 1005. In accordance with embodiments herein the camera function of the mobile device 1100, including being able to take pictures via lens 1006, may be completely accessible and actuatable when the portions 1300, 1400 are coupled together. The lens 1006 may align with outer lens window 1406. The outer lens window may be configured to meet or exceed specification for the explosion proof assembly 1000.

The mobile device 1100 may include an input connector 1010. The input connector 1010 may be configured to allow for data and/or electrical power transfer between mobile device 1100 and any external electrical device, such as a power charger (including respective cord and connector—not shown here). In accordance with embodiments herein the input connector 1010 may be completely isolated from the external environment of the assembly 1000 when the portions 1300, 1400 are coupled together. Still, the input connector 1010 may be completely accessible when the portions 1300, 1400 are coupled together.

The difference in isolation or accessibility to the input connector 1010 may be as a result of the presence of an isolator member 1513. In this respect the assembled enclosure 1200 may provide the ability for a user to gain access to the input connector 1010 without having to resort to disassembly. Although not meant to be limited to any particular type of isolation/access configuration, the Figures show the lower portion 1400 may have a generally block- or cubical-shaped isolator housing 1414, with an isolator bore 1415.

The housing 1414 may be configured for mating into a housing receptacle 1313 formed in the first portion 1300. The isolator bore 1415 may be configured with threads for a threaded engagement with respective threads of the isolator member 1513. In embodiments, the isolator member 1513 may be a screw.

The threaded engagement may have a suitable tolerance for sufficient prevention of a flame traveling therethrough. In embodiments, the isolator member 1513 may be tightened within the bore 1415 to a torque value in the range of about 15 Newton Meters ("N·m") to about 25 N·m. The torque value may be at least 20 N·m. The isolator member 1513 may have a raised head configured for easy tool access, such as via wrench, allen wrench, or other type of feature suitable for a tool to provide the requisite torque value to the tightened isolator member 1513. In other embodiments, the enclosure 1200 may have a non-torque configuration. For example, the isolator member 1513 may be self-locking.

There may be a gasket 1514 and a gasket plate 1515 configured to provide sealing engagement with the enclosure 1200 in the proximity of the housing 1414 and the receptacle 1313. This configuration may be able to further prevent or at least substantially restrict fluids or particles (e.g., dust, particulates, fibers, etc.) from entering or exiting enclosure 1200 via bore 1415 when the enclosure 1200 is assembled. For convenience there may be a retention member 1516 configured to retain the isolator member 1513 with the assembly 1000. The retention member 1516 may be a chain link having one end connected to the isolator member 1513, and an other end connected to part of the assembly 1000, such as the second portion 1400 or the gasket plate 1515. There may be a washer 1517 for sealing between the head 1513*a* and the gasket plate 1515. The gasket plate 1515 may be coupled to the enclosure 1200 via one or more gasket fasteners 1518 inserted into respective gasket fastener apertures 1519. In aspects, the gasket fasteners 1518 may be threadingly engaged into the apertures 1519.

One of skill would appreciate that enclosure 1200 could be configured to swap the housing 1414 into the first portion 1300, and the receptacle 1313 into the second portion 1400.

In accordance with embodiments herein the second button 1008 may be completely isolated from the external environment of the assembly 1000 when the portions 1300, 1400 are coupled together. Still, the second button 1008 may be completely accessible when the portions 1300, 1400 are coupled together.

The difference in isolation but yet accessibility to the second button 1008 may be as a result of the presence of a sealed depressible pin 1407. The pin 1407 may be biased, such as via spring or other suitable manner, whereby when a top 1407*a* of the pin 1407 is depressed, it will subsequently depress a bottom 1407*b* of the pin 1407 against the second button 1008; however, when the pin 1407 is released, the pin 1407 releases from depression of the second button 1008.

The pin 1407 may be sealingly disposed within a pin bore 1409. In this respect the assembled enclosure 1200 may provide the ability for a user to gain access to or otherwise actuate the second button 1008 without having to resort to disassembly, and still maintain desired isolation from the surrounding environment. Although not meant to be limited to any particular type of isolation/access configuration, the Figures show the second portion 1400 may have a generally block- or cubical-shaped pin housing 1416, with the pin bore 1409.

The pin housing 1416 may be configured for mating into a pin housing receptacle 1312 formed in the first portion 1300. One of skill would appreciate that enclosure 1200 could be configured to swap the pin housing 1416 into the first portion 1300, and the pin housing receptacle 1312 into the second portion 1400. If an explosion occurs within the enclosure 1200, the pin 1407 may will be pushed (urged) against pin housing 1416 to prevent any flame to pass through 1416.

Figure 11A:
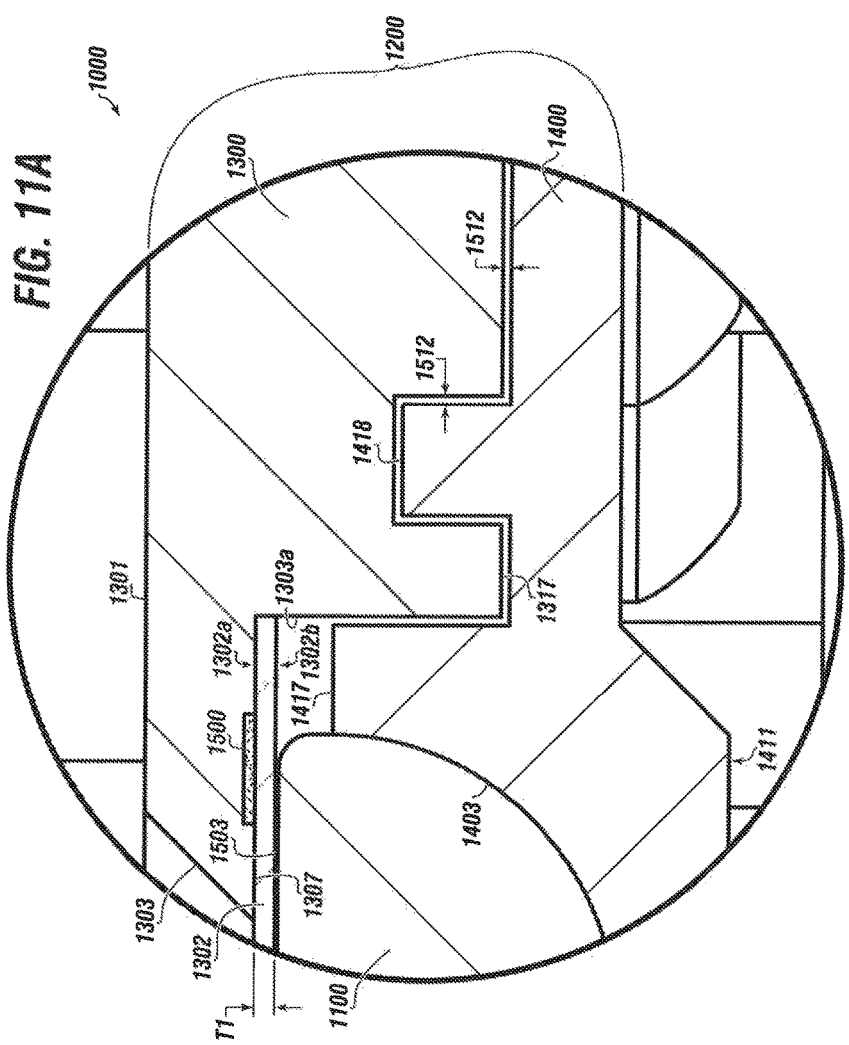
FIG. 11A shows a close-up cross-sectional view of a flame path an assembled enclosure according to embodiments of the disclosure.
Figure 11B:
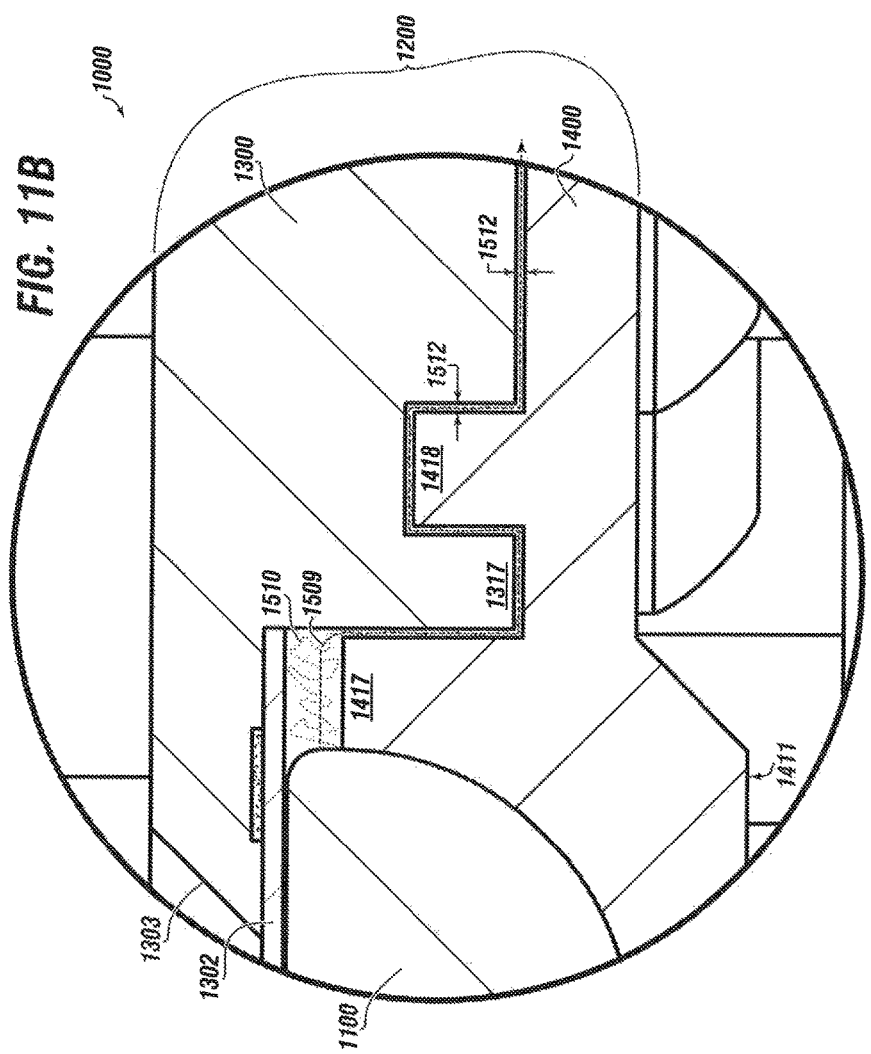
FIG. 11B shows a close-up cross-sectional view of a flame in the flame path of the assembled enclosure of FIG. 11A according to embodiments of the disclosure.

Referring now to FIGS. 11A and 11B together, a zoom-in cross-sectional view of a flame path, and a zoom-in cross-sectional view of a flame path with a flame therein, of an explosion proof assembly, in accordance with embodiments disclosed herein, are shown.

As should be readily apparent, FIGS. 11A and 11B may not be to scale. Instead, the Figures are intended to illustrate that upon zoom-in inspection, various passageways, gaps, and interstices may be present when the enclosure 1200 is assembled together (i.e., first portion 1300 and second portion 1400 are coupled together). For example, there may be a gap 1512 having a distance of less than about 0.04 inches (1000 microns) between various contact points of the first portion 1300 and the second portion 1400.

Although theoretically this could result in passage of, for example, gaseous material, air, and so forth, one of the key attributes of the assembled enclosure 1200 is the ability to dissipate a flame.

Regarding the enclosure 1200, the first portion 1300 may include a front face 1301. The first portion 1300 may include a rear face 1307 disposed opposite of front face 1301. The rear face 1307 may provide a suitable surface for sealing between the rear face 1307 and an outer touchscreen 1302. The surface for sealing may extend between an inner edge 1303 and a rear face inner edge 1303a, and therearound the rear face 1307.

The outer touchscreen 1302 may be adhesively and sealingly connected with the first portion 1300, such as via a layer of an adhesive 1500. The layer of adhesive 1500 may provide for a complete perimeter seal between the outer touchscreen 1302 and the first portion 1300. The adhesive may be suitable to withstand changes of significance in temperature, or chemicals, both from internal and external to the enclosure 1200.

The sealing engagement between the outer touchscreen 1302 and the first portion 1300 may be beneficial to so as to prevent or at least substantially restrict fluids or particles (e.g., dust, particulates, fibers, etc.) from entering or exiting the enclosure 1200 when the assembly 1000 is in its assembled configuration (e.g., FIG. 10A). The sealing may further prevent any flame path between portion 1300 and the outer touchscreen 1302.

The second portion 1400 may include a second portion inner face 1401. The inner face 1401 may be bordered by a second portion outer edge. There may be an inner chamfered surface 1403 extending around the outer edge.

The second portion 1400 may include a second portion rear outer face 1411. The rear outer face 1411 may be generally flat. The inner face 1401 may trail off into a surface forming the first dissipation wall 1417, which may extend outward and upward from edge 1402, including in an arcuate manner, into proximate engagement with the outer touchscreen 1302. As shown, the first dissipation wall 1417 may be the first (lateral) contact point of any flame resulting from failure of the mobile device 1100.

The first portion 1300 may similarly have a second dissipation wall 1317. In the event of any remnant flame moving past the first dissipation wall 1417, the flame will be resisted from passing any further beyond the second dissipation wall 1317. Still, as a further measure of added redundancy, the second portion may have a third dissipation wall 1418. One of skill would appreciate the first portion 1300 may have a grooved surface or region to accommodate mating with the first dissipation wall 1417 and the third dissipation wall 1418. And similarly the second portion 1400 may have a grooved surface or region to accommodate mating with the second dissipation wall 1318. To the naked eye the first portion 1300 and second portion 1400 may fit seamlessly together.

Referring specifically to FIG. 11B, the first portion 1300 and the second portion 1400 may be configured for assembly together whereby a flame extinguishing (or quenching) path 1509 may be formed. The extinguishing path 1509 may be likened to a path of least resistance. That is, in the event of an explosion within the enclosure 1200, the resultant flame 1510 travels therein. Like any joint, where the first portion 1300 and second 1400 are coupled together may be the path of flame travel.

To meet various standards, such as the more stringent requirements for Class 1 Div I or Zone 1, the enclosure 1200 is required to be able to withstand the effects of an internal combustion or explosion that may produce a flame, which could in turn be an ignition source for various materials that may be associated with the Class 1 Div I or Zone 1.

It has been discovered that the flame 1510 (or its energy) may be extinguished or otherwise dissipated by the presence of one or more flame barriers or dissipation walls 1417, 1317, 1418.

Referring now to FIG. 12, a back isometric component breakout view of an explosion proof assembly having a modified second portion, in accordance with embodiments disclosed herein, in shown.

While it need not be exactly the same, an assembly 2000 may be like that of assembly of FIGS. 10A-10F, and components thereof may be duplicate or analogous. Thus, only a brief discussion of the assembly 2000 is provided, recognizing that differences, if any, would be discernable by one of skill in the art, especially in view of the present disclosure.

As illustrated, explosion proof assembly 2000 may include a mobile device 2100 associated with a flame extinguishing enclosure 2200. The enclosure 2200 may include a first or upper portion 2300 configured for releasable coupling to a second or lower portion 2400. In aspects, the mobile device 2100 may be an iPad® or iPhone® produced by Apple, Inc., including the recent iPhone 8. However, the mobile device 2100 is not meant to be limited, and include other varying types and styles of computer-related devices, including but not limited to those from other manufacturers.

In the case of the new iPhone 8, and comparable, the enclosure 2200 may include a rear window 2318. The use of the rear window 2318 may aid to prevent or mitigate interference with any electromagnetic "wireless" recharging functionality of the mobile device 2100. Accordingly, the second portion 2400 may have an opening 2419 configured to receive the rear window 2318.

The assembly 2000 may be configured for use in the setting when the upper portion 2300 is sealingly coupled with the lowered portion 2400, with the mobile device 2100 disposed therein. 'Sealingly coupled' may include the portions 2300, 2400 being sealingly engaged to certain specification, but some amount of disconnect is permissible. In this sense 'sealing' may refer to a metal-to-metal seal.

Although not limited, the rear window 2318 may be adhesively and sealingly connected with the second portion 2400, such as via a layer of an adhesive (not viewable here). The layer of adhesive may provide for a complete perimeter seal between the rear window 2318 and the second portion 2400. The adhesive may be suitable to withstand changes of significance in temperature, or chemicals, both from internal and external to the enclosure 2200.

Figure 13C:
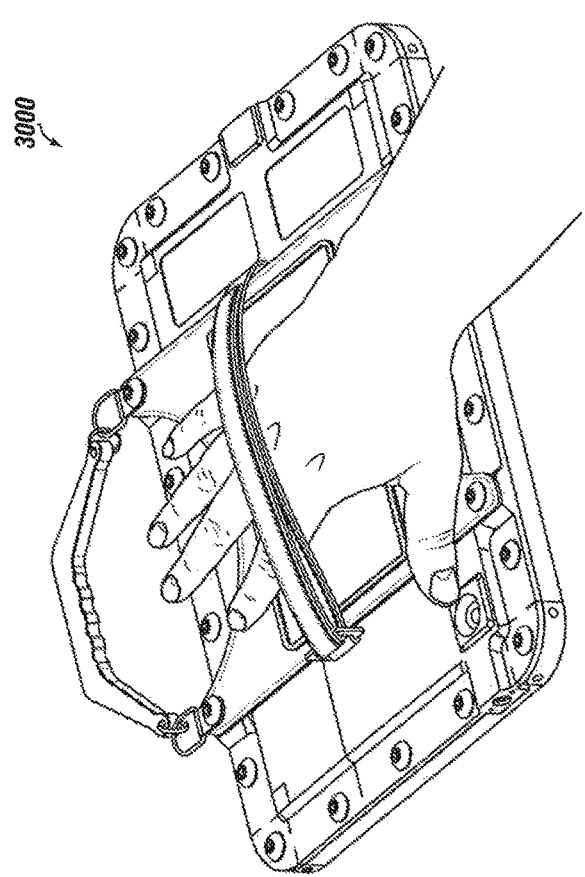
FIG. 13C shows a side profile view of a user holding the explosion proof assembly of FIG. 13A according to embodiments of the disclosure.

Referring now to FIGS. 13A, 13B, and 13C together, a top view of a hand-held accessory releasably coupled to a rear side of an explosion proof assembly, a top view of the hand-held accessory of FIG. 13A, and a side view of a user holding the explosion proof assembly of FIG. 13A, respectively, in accordance with embodiments disclosed herein, are shown.

While it need not be exactly the same, an assembly 3000 may be like that of assembly of FIGS. 10A-10F, 12, etc., and components thereof may be duplicate or analogous. Thus, only a brief discussion of the assembly 3000 is provided, recognizing that differences, if any, would be discernable by one of skill in the art, especially in view of the present disclosure.

As illustrated, explosion proof assembly 3000 may include a mobile device (not shown here) associated with a flame extinguishing enclosure 3200. The enclosure 3200 may include a first or upper portion 3300 configured for releasable coupling to a second or lower portion 3400. In aspects, the mobile device 2100 may be an iPad® or iPhone® produced by Apple, Inc., The assembly 3000 may be configured for use in the setting when the upper portion 3300 is sealingly coupled with the lowered portion 3400, with the mobile device disposed therein. 'Sealingly coupled' may include the portions 3300, 3400 being sealingly engaged to certain specification, but some amount of disconnect is permissible. In this sense 'sealing' may refer to a metal-to-metal seal.

To aid in use of the assembly 3000, various accessories may be utilized, including those that provide additional grip, shock absorption, hand-holding, and the like. As shown in FIGS. 13A-13C, an attachable hand-holding accessory 3520 may be coupled to the assembly, such as to the rear side 3411 of the second portion 3400.

Although not limited to any particular hand-holding accessory configuration (and material selection thereof), the accessory 3520 may be made of a nylon-based material.

The accessory 3520 may have an attachment backing 3521, which may be of minimal thickness and generally polygonal in shape. The backing 3521 may be configured for releasable attachment to the rear face 3411. In this respect, the backing 3521 may have one or more apertures (not viewable here) for receiving a respective attachment fastener 3528 therethrough. As shown, there may be a fastener 3528 inserted through four corner apertures. Accordingly, the second portion 3400 may also have receptacles (not viewable here) that align with the apertures, to which the fastener 3528 may be securely positioned therein. In aspects, the fasteners 3528 may be screwed into the second portion 3400.

It may be desirous to attach and detach the accessory 3520 without having the jeopardize the integrity of the assembled enclosure 3200. Thus, the receptacles need not have a depth that extends all the way through the thickness of the second portion 3400. Accordingly, the second portion 3400 may have various raised faces 3530 to accommodate and appreciable amount of material depth to which the fastener 3528 may extend.

In other aspects, it may be desirous to disassemble the enclosure 3200 without removing the accessory 3520. Thus, the accessory 3520 may be shaped in a manner to provide access to enclosure fasteners 3511. As shown, the accessory 3520 may have one or more arcuate segments 3527.

The accessory 3520 may have a hand hold strap 3522. The strap 3522 may be movably, yet fixedly connected at strap attachment point 3525. While not meant to be limited to any particular hand hold configuration, the hand hold strap 3522 may be of sufficient length for inserting into an eyelet 3524, and then wrapping back over for self-securing to itself, such as via a Velcro layer (e.g., a mini-hook/loop) 3526. The layer 3526 may be of suitable size to provide adjustment for accommodation of hands of various sizes, as would be apparent to one of skill in the art.

As shown in FIG. 13C, a user 3532 can slide his/her hand into the hand-insertion region 3523. Using the hand on the back of the enclosure 3520 may provide extra stability as the user 3532 interfaces with the mobile device via outer touchscreen 3302.

For further convenience, a carrying handle 3530 may be coupled to the enclosure 3200. As illustrated in FIG. 13A, the handle 3530 may be coupled to the second portion 3400 via handle couplers 3529 on each side of the handle.

Figure 14A:
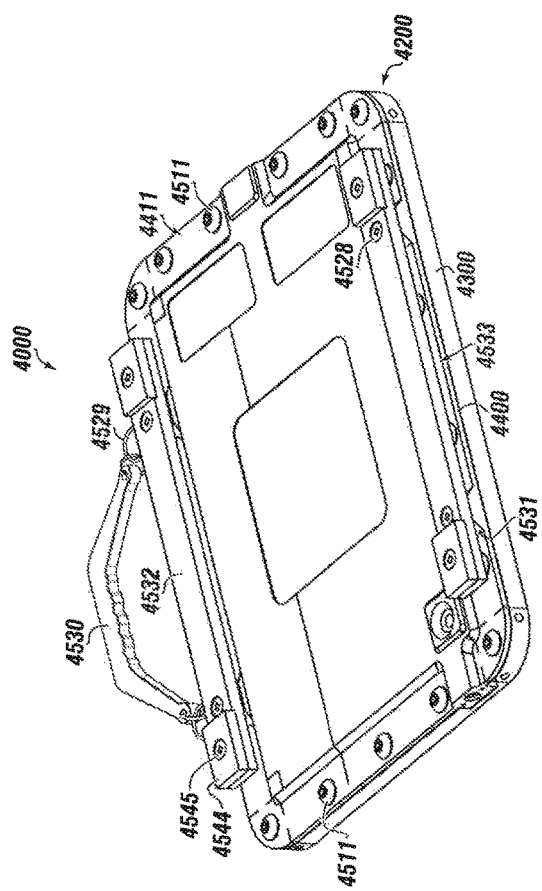
FIG. 14A shows a top view of a magnetic attachment accessory releasably coupled to a rear side of an explosion proof assembly according to embodiments of the disclosure.
Figure 14B:
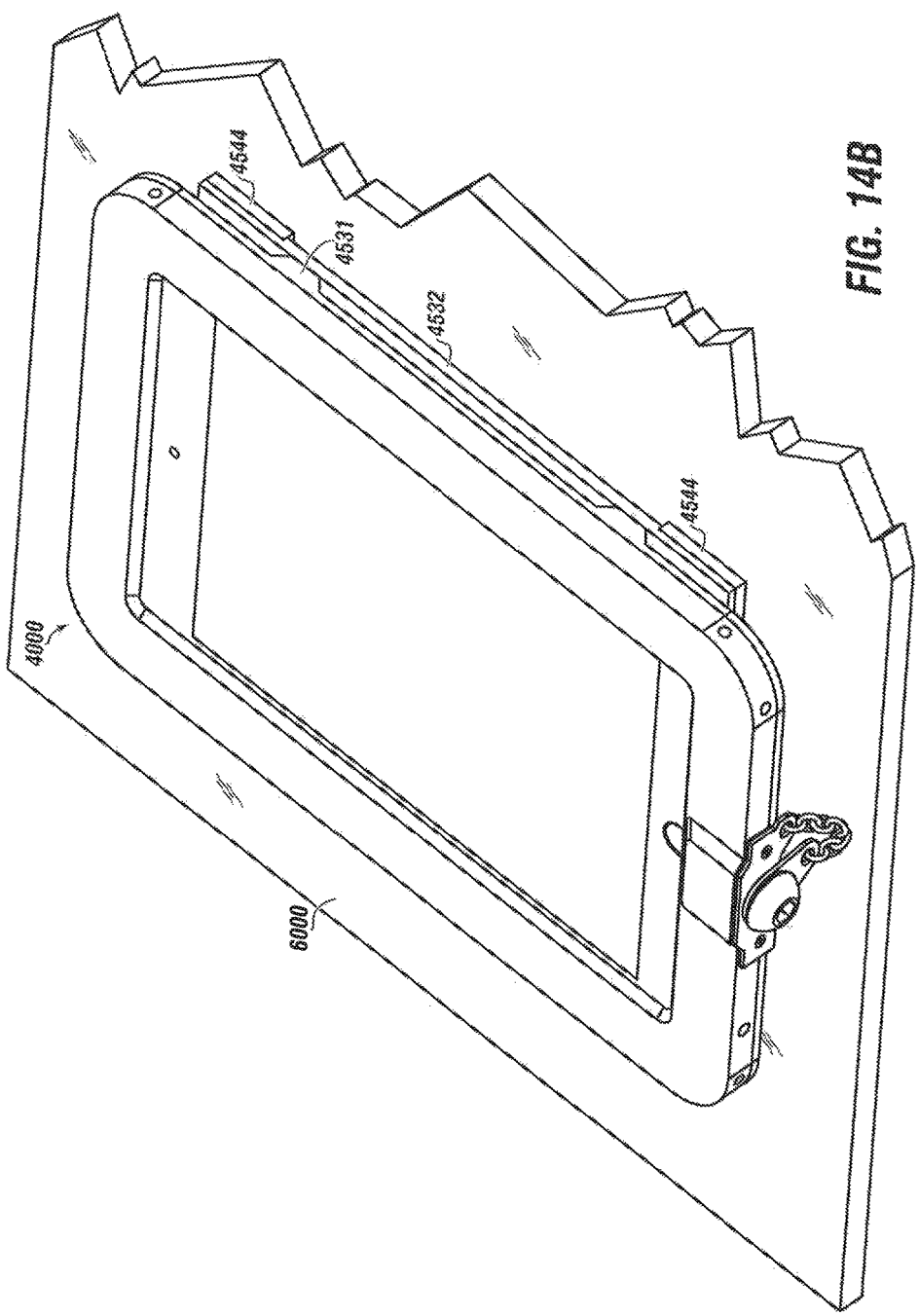
FIG. 14B shows a side profile view of a user using the explosion proof assembly of FIG. 14A while magnetically attached to a surface according to embodiments of the disclosure.

Referring now to FIGS. 14A and 14B together, a top view of a magnetic attachment accessory releasably coupled to a rear side of an explosion proof assembly and a side view of a user using the explosion proof assembly of FIG. 14B while magnetically attached to a surface, respectively, in accordance with embodiments disclosed herein, are shown.

While it need not be exactly the same, an assembly 4000 may be like that of any assembly disclosed herein, and components thereof may be duplicate or analogous. Thus, only a brief discussion of the assembly 4000 is provided, recognizing that differences, if any, would be discernable by one of skill in the art, especially in view of the present disclosure.

As illustrated, explosion proof assembly 4000 may include a mobile device (not shown here) associated with a flame extinguishing enclosure 4200. The enclosure 4200 may include a first or upper portion 4300 configured for releasable coupling to a second or lower portion 4400.

To aid in use of the assembly 4000, various accessories may be utilized, including those that provide additional grip, shock absorption, hand-holding, and the like. As shown in FIGS. 14A-14B, magnetic attachment accessory 4520 may be coupled to the assembly, such as to the rear side 4411 of the second portion 4400.

Although not limited to any particular accessory configuration (and material selection thereof), the accessory 4520 may include various magnetic and non-magnetic components coupled together. As shown in the Figures, the accessory 4520 may include at least on non-magnetic support bar 4532 coupled to raised faces 4531. The support bar 4532 may have a generally rectangular prism shape The backing support bar(s) 4532 may be configured for releasable attachment to the rear face 4411. In this respect, the support bar 4532 may have one or more apertures (partially viewable here) for receiving a respective attachment fastener 4528 therethrough. As shown, there may be a fastener 4528 inserted through apertures on each end of the support bar 4532. Accordingly, the second portion 4400 may also have receptacles (not viewable here) that align with the apertures, to which the fastener 4528 may be securely positioned therein. In aspects, the fasteners 4528 may be screwed into the second portion 4400.

Although a magnet 4544 may be directly coupled to the rear face 4411, the Figures show the magnet 4544 coupled onto the support bar 4532. In aspects, there may be a first magnet on one end of the support bar 4532, and a second magnet disposed on the opposite end of the support bar. An other side of second portion 4400 may have a similar support bar/magnet configuration (e.g., a support bar 4532 on each side, and a magnet on each end of the respective support bar).

It may be desirous to attach and detach the accessory 4520 without having the jeopardize the integrity of the assembled enclosure 4200. Thus, the receptacles need not have a depth that extends all the way through the thickness of the second portion 4400. Accordingly, the second portion 4400 may have various raised faces 4531 to accommodate and appreciable amount of material depth to which the fastener 4528 may extend and engage therein. As shown the presence of the raised faces 4531 may provide suitable clearance 4533 so that the support bar 4532 does not come into inadvertent contact with enclosure fasteners 4511.

As shown in FIG. 14B, a user 4532 may magnetically attach the assembly 4000 to a suitable surface, which may provide extra stability as the user 4532 interfaces with the mobile device via outer touchscreen 4302. Moreover, the user 4532 is now relieved of having to use one hand to hold the assembly 4000.

For further convenience, a carrying handle 4530 may be coupled to the enclosure 4200. The handle 4530 may be coupled to the second portion 4400 via handle couplers 4529 on each side of the handle.

Advantages.

Previously operators/users would not be allowed to carry an electronic mobile device with them into hazardous areas (C1D2/Zone2/Zone2/Zone1) as there was no guaranty these devices will not create a spark (i.e., explosion). So they were using pen and paper to do their job (inspection, maintenance, turn arounds, etc.).

Embodiments of the disclosure advantageously provide for an explosion proof assembly that may allow operators/users to now carry their mobile devices within an explosion proof assembly of the disclosure. Users can now advantageously and beneficially use customized Apps, take pictures, take videos, and collaborate with their peers, such via Skype or other Apps. Their work is a lot more efficient and is still safe.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure presented herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of any claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. An explosion proof assembly comprising: a first portion comprising a first portion rear face, a first portion outer edge, a first portion inner edge, a second dissipation wall, a pin housing receptacle, and a window;
   an outer touchscreen adhesively sealed around a perimeter of the first portion rear face;
   a second portion comprising a second portion inner face, a pin housing, a second portion inner surface defined by a second portion inner edge that transitions into a first dissipation wall;
   a mobile device disposed between the window and the second portion inner face, the mobile device being operable via a mobile device touchscreen;
   wherein the first portion and the second portion are releasably coupled to each other to form an enclosure, wherein the pin housing mates within the pin housing receptacle, wherein upon assembly the outer touchscreen is engaged with and transmissive to the mobile device touchscreen, wherein the second dissipation wall is adjacent to the first dissipation wall,
   wherein a portion of the first dissipation wall protrudes into the second dissipation wall, the portion being square in shape in lateral side cross section view of the explosion proof assembly;
   wherein the first portion comprise a plurality of first mating apertures, wherein the second portion comprises a plurality of second mating apertures corresponding to the plurality of first mating apertures, wherein each respective first mating aperture and second mating aperture has a fastener disposed therein, wherein upon mating of the first portion and the second portion, each fastener is tightened to a torque value in the range of 5 Newton-meter to 6 Newton-meter, and
   wherein when the first dissipation wall mates with the second dissipation wall it forms a complete metal-to-metal seal.

2. The explosion proof assembly of claim 1, wherein the mobile device comprises an on-off button, wherein the pin housing comprises a movable pin, wherein upon assembly the movable pin is aligned with the on-off button, and wherein depressing of the movable pin results in depressing the on-off button.

3. The explosion proof assembly of claim 2, wherein the first portion comprise a plurality of first mating apertures, wherein the second portion comprises a plurality of second mating apertures corresponding to the plurality of first mating apertures, wherein each respective first mating aperture and second mating aperture has a fastener disposed therein, wherein each fastener is tightened to a torque value in the range of 5 Newton·meter to 6 Newton·meter.

4. The explosion proof assembly of claim 3, wherein the mobile device is configured for taking photos via a camera lens, wherein the second portion comprises a lens window, and wherein upon assembly the camera lens and the lens window are aligned.

5. The explosion proof assembly of claim 1, wherein the mobile device is configured for taking photos via a camera lens, wherein the second portion comprises a lens window, and wherein upon assembly the camera lens and the lens window are aligned.

6. The explosion proof assembly of claim 5, wherein the mobile device is configured for electromagnetic wireless recharging functionality, and wherein the second portion comprises a second portion window sealingly closed off.

7. The explosion proof assembly of claim 1, wherein the mobile device is configured for electromagnetic wireless recharging functionality, and wherein the second portion comprises a second portion window sealingly closed off.

8. The explosion proof assembly of claim 1, wherein upon coupling the assembly is configured to at least partially dissipate a flame resultant from an explosion of the mobile device.

9. An explosion proof assembly comprising: a first portion comprising a first portion rear face, a first portion outer edge, a first portion inner edge, a second dissipation wall, a pin housing receptacle, and a window;
   an outer touchscreen adhesively sealed around a perimeter of the first portion rear face;

a second portion comprising a second portion inner face, a pin housing, a second portion inner surface defined by a second portion inner edge that transitions into a first dissipation wall;

a mobile device disposed between the window and the second portion inner face, the mobile device being operable via a mobile device touchscreen; wherein the first portion and the second portion are releasably coupled to each other to form an enclosure, wherein the pin housing mates within the pin housing receptacle, wherein upon assembly the outer touchscreen is engaged with and transmissive to the mobile device touchscreen, wherein the second dissipation wall is adjacent to the first dissipation wall, wherein a ridged portion of the first dissipation wall protrudes into the second dissipation wall, wherein the mobile device comprises an on-off button, wherein the pin housing comprises a movable pin, wherein upon assembly the movable pin is aligned with the on-off button, wherein depressing of the movable pin results in depressing the on-off button, and wherein upon coupling the assembly is configured to at least partially dissipate a flame resultant from an explosion of the mobile device;

wherein the first portion comprise a plurality of first mating apertures, wherein the second portion comprises a plurality of second mating apertures corresponding to the plurality of first mating apertures, wherein each respective first mating aperture and second mating aperture has a fastener disposed therein, wherein upon mating of the first portion and the second portion, each fastener is tightened to a torque value in the range of 5 Newton-meter to 6 Newton-meter, and wherein when the first dissipation wall mates with the second dissipation wall it forms a complete metal-to-metal seal.

10. The explosion proof assembly of claim 9, wherein the mobile device is configured for taking photos via a camera lens, wherein the second portion comprises a lens window, and wherein upon assembly the camera lens and the lens window are aligned, and wherein the ridged portion is square-shaped in lateral cross-section.

11. The explosion proof assembly of claim 10, wherein the first portion comprise a plurality of first mating apertures, wherein the second portion comprises a plurality of second mating apertures corresponding to the plurality of first mating apertures, wherein each respective first mating aperture and second mating aperture has a fastener disposed therein, and wherein each fastener is tightened to a torque value in the range of 5 Newton·meter to 6 Newton·meter.

12. The explosion proof assembly of claim 11, wherein the mobile device is configured for electromagnetic wireless recharging functionality, and wherein the second portion comprises a second portion window sealingly closed off.

13. The explosion proof assembly of claim 9, wherein the mobile device is configured for electromagnetic wireless recharging functionality, and wherein the second portion comprises a second portion window sealingly closed off.

14. An explosion proof assembly comprising: a first portion comprising a first portion rear face, a first portion outer edge, a pin housing receptacle, a first portion inner edge, a second dissipation wall, and a window;

an outer touchscreen adhesively sealed around a perimeter of the first portion rear face;

a second portion releasably coupled to the first portion to form an enclosure, the second portion further comprising a pin housing, a second portion inner surface defined by a second portion inner edge that transitions into a first dissipation wall extending substantially therearound, and a third dissipation wall; and a mobile device disposed within the enclosure, the mobile device being operable via a mobile device touchscreen; wherein the pin housing mates within the pin housing receptacle, wherein upon coupling the outer touchscreen is transmissive to the mobile device touchscreen of a touch actuation signal made thereon, wherein the mobile device comprises an input connector, wherein the mobile device comprises an on-off button, wherein the pin housing comprises a movable pin, wherein upon assembly the movable pin is aligned with the on-off button, and wherein depressing of the movable pin results in depressing the on-off button;

wherein the first portion comprise a plurality of first mating apertures, wherein the second portion comprises a plurality of second mating apertures corresponding to the plurality of first mating apertures, wherein each respective first mating aperture and second mating aperture has a fastener disposed therein, wherein upon mating of the first portion and the second portion, each fastener is tightened to a torque value in the range of 5 Newton-meter to 6 Newton-meter, and wherein when the first dissipation wall mates with the second dissipation wall it forms a complete metal-to-metal seal.

15. The explosion proof assembly of claim 14, wherein the first portion comprise a plurality of first mating apertures, wherein the second portion comprises a plurality of second mating apertures corresponding to the plurality of first mating apertures, wherein each respective first mating aperture and second mating aperture has a fastener disposed therein, wherein each fastener is tightened to a torque value in the range of 5 Newton·meter to 6 Newton·meter.

16. The explosion proof assembly of claim 14, wherein the mobile device is configured for taking photos via a camera lens, wherein the second portion comprises a lens window, and wherein upon assembly the camera lens and the lens window are aligned.

17. The explosion proof assembly of claim 16, wherein upon coupling the assembly is configured to at least partially dissipate a flame resultant from an explosion of the mobile device prior to any portion of the flame exiting the assembly.

18. The explosion proof assembly of claim 17, wherein the mobile device is configured for electromagnetic wireless recharging functionality, and wherein the second portion comprises a second portion window sealingly closed off.

* * * * *